US012587682B2

(12) United States Patent
Choi et al.

(10) Patent No.: US 12,587,682 B2
(45) Date of Patent: Mar. 24, 2026

(54) NON-SEPARABLE PRIMARY TRANSFORM DESIGN METHOD AND APPARATUS

(71) Applicant: LG Electronics Inc., Seoul (KR)

(72) Inventors: Jungah Choi, Seoul (KR); Seunghwan Kim, Seoul (KR); Moonmo Koo, Seoul (KR); Jie Zhao, Seoul (KR); Jaehyun Lim, Seoul (KR); Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 18/703,597

(22) PCT Filed: Oct. 20, 2022

(86) PCT No.: PCT/KR2022/016033
§ 371 (c)(1),
(2) Date: Apr. 22, 2024

(87) PCT Pub. No.: WO2023/068840
PCT Pub. Date: Apr. 27, 2023

(65) Prior Publication Data
US 2024/0414374 A1      Dec. 12, 2024

Related U.S. Application Data

(60) Provisional application No. 63/270,573, filed on Oct. 22, 2021.

(51) Int. Cl.
*H04N 19/60*      (2014.01)
*H04N 19/159*      (2014.01)
(Continued)

(52) U.S. Cl.
CPC ........... *H04N 19/60* (2014.11); *H04N 19/159* (2014.11); *H04N 19/176* (2014.11); *H04N 19/18* (2014.11); *H04N 19/70* (2014.11)

(58) Field of Classification Search
CPC .... H04N 19/159; H04N 19/176; H04N 19/60; H04N 19/18; H04N 19/70
See application file for complete search history.

(56) References Cited

U.S. PATENT DOCUMENTS

2018/0103252 A1* 4/2018 Hsieh ................... H04N 19/176
2019/0306536 A1* 10/2019 Lim ...................... H04N 19/159
(Continued)

FOREIGN PATENT DOCUMENTS

CA          3137181 A1      10/2020
EP          3723376 A1      10/2020
(Continued)

OTHER PUBLICATIONS

International Search Report and Written Opinion in International Appln. No. PCT/KR2022/016033, mailed on Jan. 20, 2023, 11 pages (with English translation).
(Continued)

*Primary Examiner* — Zhubing Ren
(74) *Attorney, Agent, or Firm* — Fish & Richardson P.C.

(57) ABSTRACT

According to the disclosure of the present document, by configuring a primary transform to include a non-separable transform, higher encoding efficiency may be expected compared to the existing primary transform including only a separable transform. Also, by efficiently signaling information related to a primary transform including a separable transform and a non-separable transform, the effect of reducing the number of bits and improving coding performance may be expected. In addition, by efficiently applying a primary transform and a secondary transform, computational complexity and power consumption may be reduced, and latency required for additionally generated transform coefficient processing may be minimized.

20 Claims, 13 Drawing Sheets

(51) Int. Cl.
　　*H04N 19/176*　　(2014.01)
　　*H04N 19/18*　　(2014.01)
　　*H04N 19/70*　　(2014.01)

(56)　　　　　　References Cited

U.S. PATENT DOCUMENTS

| | | | | |
|---|---|---|---|---|
| 2019/0387241 A1* | 12/2019 | Kim | ..................... | H04N 19/12 |
| 2020/0304818 A1* | 9/2020 | Koo | ..................... | H04N 19/176 |
| 2020/0366900 A1* | 11/2020 | Jun | ..................... | H04N 19/105 |
| 2022/0210451 A1* | 6/2022 | Jung | ..................... | H04N 19/174 |

FOREIGN PATENT DOCUMENTS

| | | |
|---|---|---|
| EP | 4425930 A1 | 9/2024 |
| KR | 10-2020-0086734 | 7/2020 |
| WO | WO 2020/213946 | 10/2020 |
| WO | WO 2021/136821 | 7/2021 |

OTHER PUBLICATIONS

Ray et al., "Enhanced Intra MTS and LFNST for compression beyond VVC," Joint Video Experts Team (JVET) of ITU-T SG 16 WP 3 and ISO/IEC JTC 1/SC 29, Document: JVET-V0116-v3, 22nd Meeting, by teleconference, Apr. 20-28, 2021, 11 pages.

Choi et al., "AHG12: A study on non-separable primary transform," JVET-AA0064-v2, Joint Video Experts Team (JVET) of ITU-T SG 16 WP3 and ISO/IEC JTC 1/SC 29, 27th Meeting, by teleconference, Jul. 13-22, 2022, 3 pages.

Extended European Search Report in European Appln. No. 22884062. 5, mailed on Sep. 11, 2025, 11 pages.

* cited by examiner

FIG. 2

Reduced
Transform

Residual —→ $T \times [\ ]$ —→ Coefficient (a)

Reduced Inv.
Transform

Coefficient —→ $T^{t} \times [\ ]$ —→ Residual (b)

DERIVE RESIDUAL SAMPLES ~ S900

DERIVE TRANSFORM COEFFICIENTS
BY PERFORMING PRIMARY TRANSFORM
BASED ON TRANSFORM KERNEL ~ S910

GENERATE TRANSFORM INDEX INFORMATION
RELATED TO TRANSFORM KERNEL ~ S920

GENERATE RESIDUAL INFORMATION
BASED ON TRANSFORM COEFFICIENTS ~ S930

ENCODE IMAGE INFORMATION ~ S940

NON-SEPARABLE PRIMARY TRANSFORM DESIGN METHOD AND APPARATUS

CROSS-REFERENCE TO RELATED APPLICATIONS

This application is a National Stage application under 35 U.S.C. § 371 of International Application No. PCT/KR2022/016033, filed on Oct. 20, 2022, which claims the benefit of U.S. Provisional Application No. 63/270,573, filed on Oct. 22, 2021. The disclosures of the prior applications are incorporated by reference herein in their entirety.

TECHNICAL FIELD

The present disclosure relates to video/image coding technology, and more particularly, to a method for effectively signaling information on a transform in performing a non-separable primary transform in a video or image coding system.

BACKGROUND

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

An exemplary embodiment of the present disclosure provides a method and an apparatus for enhancing video/image coding efficiency.

An exemplary embodiment of the present disclosure provides an image coding method and an apparatus related to where the primary transform from the spatial domain to the frequency domain includes a non-separable transform.

An exemplary embodiment of the present disclosure provides a method and an apparatus for effectively signaling transform index information based on the primary transform including a separable transform and the non-separable transform.

An exemplary embodiment of the present disclosure provides a method and an apparatus for effectively applying the primary transform and a secondary transform.

An exemplary embodiment of the present disclosure provides a method and an apparatus for effectively transmitting information on kernel applied to the primary transform including the non-separable transform.

An exemplary embodiment of the present disclosure provides a video/image decoding method performed by a decoding apparatus.

An exemplary embodiment of the present disclosure provides a decoding apparatus for performing a video/image decoding.

An exemplary embodiment of the present disclosure provides a video/image encoding method performed by an encoding apparatus.

An exemplary embodiment of the present disclosure provides an encoding apparatus for performing video/image encoding.

An exemplary embodiment of the present disclosure provides a computer readable digital storage medium in which encoded video/image information generated by the video/image encoding method disclosed in at least one of the exemplary embodiments of the present disclosure is stored.

An exemplary embodiment of the present disclosure provides a computer readable digital storage medium in which encoded information or encoded video/image information causing the video/image decoding method disclosed in at least one of the exemplary embodiments of the present disclosure to be performed by the decoding apparatus is stored.

An exemplary embodiment of the present disclosure provides a method of transmitting video/image data including a bitstream generated based on the video/image encoding method disclosed in at least one of the embodiments of this disclosure.

An exemplary embodiment of the present disclosure provides a transmission apparatus of transmitting video/image data including a bitstream generated based on the video/image encoding method disclosed in at least one of the embodiments of this disclosure.

BRIEF DESCRIPTION OF THE DRAWINGS

FIG. 2 is a diagram for schematically explaining a configuration of a video/image encoding apparatus to which the exemplary embodiments of the present disclosure are applicable.

DETAILED DESCRIPTION

Figure 1:
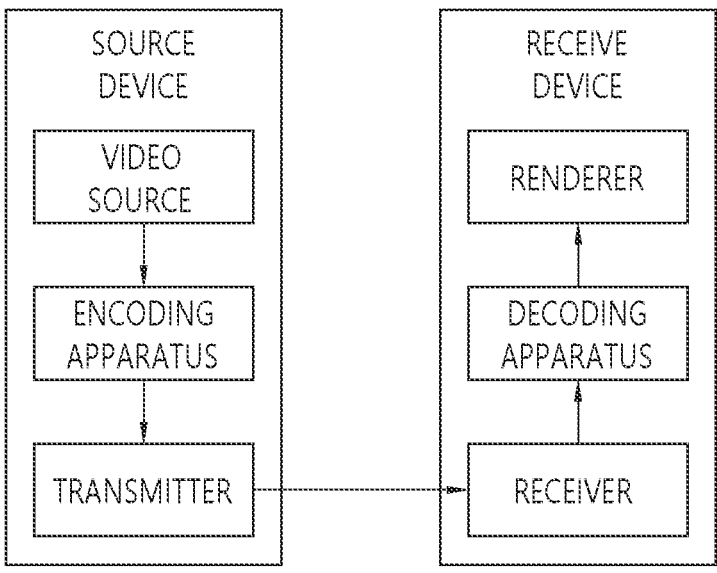
FIG. 1 schematically illustrates an example of a video/image coding system to which exemplary embodiments of the present disclosure are applicable.

This disclosure may be modified in various forms, and specific embodiments thereof will be described and shown in the drawings. However, the embodiments are not intended for limiting this disclosure. The terms used in the following description are used to merely describe specific embodiments, but are not intended to limit this disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this disclosure are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this disclosure without departing from the spirit of this disclosure.

Hereinafter, exemplary embodiments of this disclosure will be described in detail with reference to the accompanying drawings. Hereinafter, the same reference numerals are used for the same components in the drawings, and redundant description of the same components may be omitted.

FIG. 1 schematically illustrates an example of a video/image coding system to which exemplary embodiments of the present disclosure are applicable.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB. SD. CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present disclosure relates to a video/image coding. For example, methods/exemplary embodiments disclosed in the present disclosure are applicable to a method disclosed in a versatile video coding (VVC) standard. Further, the methods/exemplary embodiments disclosed in the present disclosure are applicable to a method disclosed in an essential video coding (EVC) standard, an AOMedia Video 1 (AV1) standard, a 2nd generation of audio video coding (AVS2) standard, or a next-generation video/image coding standard (e.g., H.267 or H.268).

This disclosure presents various embodiments of video/image coding, and the embodiments may be performed in combination with each other unless otherwise mentioned.

In the present disclosure, a video may mean a group of a series of images over time. A picture generally means a unit representing one image in a specific time period, and a slice and a tile are units constituting a part of a picture in coding. The slice/tile may include one or more coding tree units (CTUs). One picture may be composed of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within a picture.

A pixel or a pel may mean a smallest unit constituting one picture (or image). Also 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex., Cb, cr) blocks. The unit may be used interchangeably with terms such as block or area in some cases. In a general case, an M×N block may include samples (or sample arrays) or a set (or array) of transform coefficients of M columns and N rows.

In the present disclosure. "A or B" may mean "only A", "only B", or "both A and B". In other words, in the present disclosure, "A or B" may be interpreted as "A and/or B". For example, in the present disclosure, "A, B, or C" may mean "only A", "only B", "only C", or "any combination of A. B, and C".

A slash (/) or a comma used in the present disclosure may mean "and/or". For example, "A/B" may mean "A and/or B". Therefore, "A/B" may mean "only A", "only B", or "both A and B". For example, "A, B, C" may mean "A, B, or C".

In the present disclosure. "at least one of A and B" may mean "only A", "only B", or "both A and B". Further, in the present disclosure, expressions of "at least one of A or B" or "at least one of A and/or B" may be interpreted the same as "at least one of A and B".

Further, in the present disclosure. "at least one of A, B, and C" may mean "only A", "only B", "only C", or "any combination of A, B, and C". Further, "at least one of A, B, or C" or "at least one of A, B, and/or C" may mean "at least one of A, B, and C".

Further, a parenthesis used in the present disclosure may mean "for example". Specifically, if it is indicated by a "prediction (intra prediction)", an "intra prediction" may be proposed as an example of the "prediction". In other words, the "prediction" in the present disclosure is not limited to the "intra prediction", and the "intra prediction" may be proposed as the example of the "prediction". Further, even if it is indicated by a "prediction (i.e., intra prediction)", the "intra prediction" may be proposed as the example of the "prediction".

In the present disclosure, a technical feature individually described in one drawing may also be individually implemented, and also be simultaneously implemented.

Figure 2:
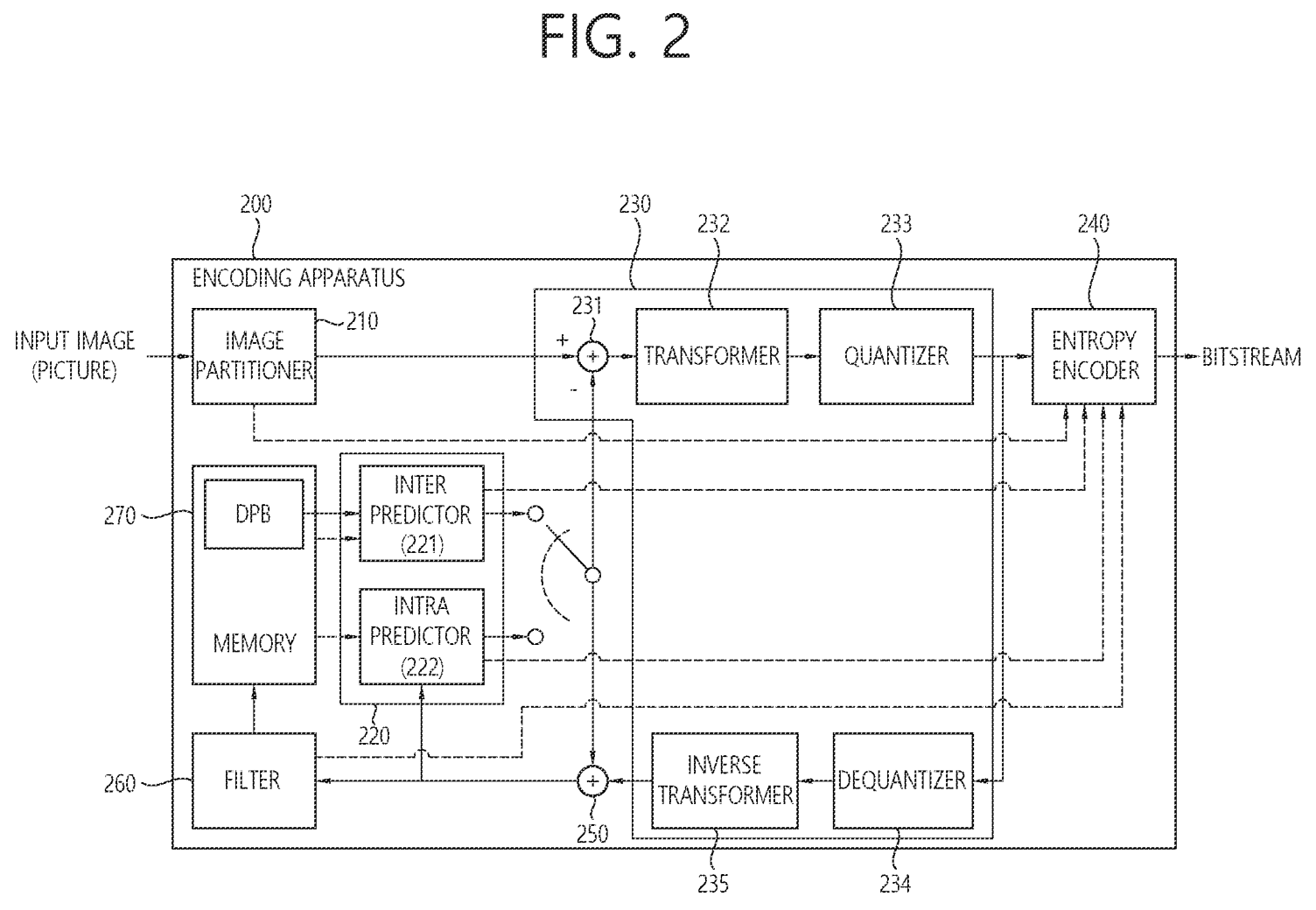

FIG. 2 is a diagram for schematically explaining a configuration of a video/image encoding apparatus to which exemplary embodiments of the present disclosure are applicable. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode being applied to the current block by using a prediction mode being applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. Encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
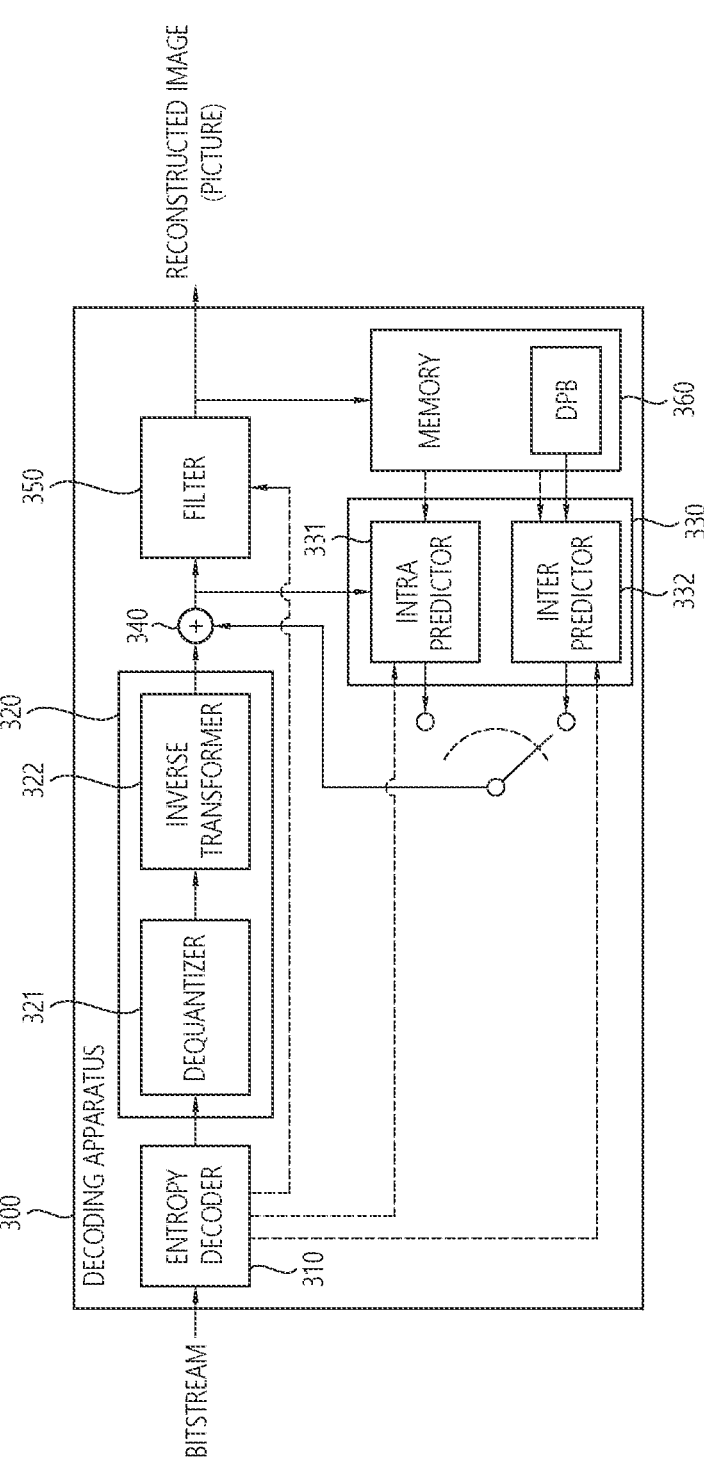
FIG. 3 is a diagram for schematically explaining a configuration of a video/image decoding apparatus to which the exemplary embodiments of the present disclosure are applicable.

FIG. 3 is a diagram schematically explaining a configuration of a video/image decoding apparatus to which exemplary embodiments of the present disclosure are applicable. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor being applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this disclosure may be decoded may decode the decoding procedure and obtained from the bitstream. For example, the entropy decoder 310 decodes the information in the bitstream based on a coding method such as exponential Golomb coding. CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown)

for receiving a signal output from the encoding apparatus may be further configured as an internal/external element of the decoding apparatus 300, or the receiver may be a component of the entropy decoder 310. Meanwhile, the decoding apparatus according to this disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor 330 may perform prediction on the current block and generate a predicted block including prediction samples for the current block. The predictor 330 may determine whether intra prediction or inter prediction is applied to the current block based on the information on the prediction output from the entropy decoder 310 and may determine a specific intra/inter prediction mode.

The predictor 330 may generate a prediction signal based on various prediction methods described below. For example, the predictor 330 may not only apply intra prediction or inter prediction to predict one block but also simultaneously apply intra prediction and inter prediction. This may be called combined inter and intra prediction (CIIP). In addition, the predictor 330 may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode being applied to the current block by using a prediction mode being applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode being applied to the current block by using the prediction mode being applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 332 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In this disclosure, the embodiments described in the filter 260, the inter predictor 221, and the intra predictor 222 of the encoding apparatus 200 may be the same as or may be respectively applied to correspond to the filter 350, the inter predictor 332, and the intra predictor 331 of the decoding apparatus 300. The same may also apply to the inter predictor 332 and the intra predictor 331.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present disclosure, at least one of the quantization/the dequantization and/or the transform/the inverse transform may be omitted. If the quantization/dequantization is omitted, the quantized transform coefficient may be referred to as a transform coefficient. If the transform/the inverse transform are omitted, the transform coefficient may also be referred to as a coefficient or a residual coefficient, or for unity of expression, also be still referred to as the transform coefficient. Whether or not the transform/inverse transform is omitted may be signaled based on the transform skip flag. For example, the transform skip flag may be the transform skip flag syntax element.

Further, in the present disclosure, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present disclosure.

Figure 4:
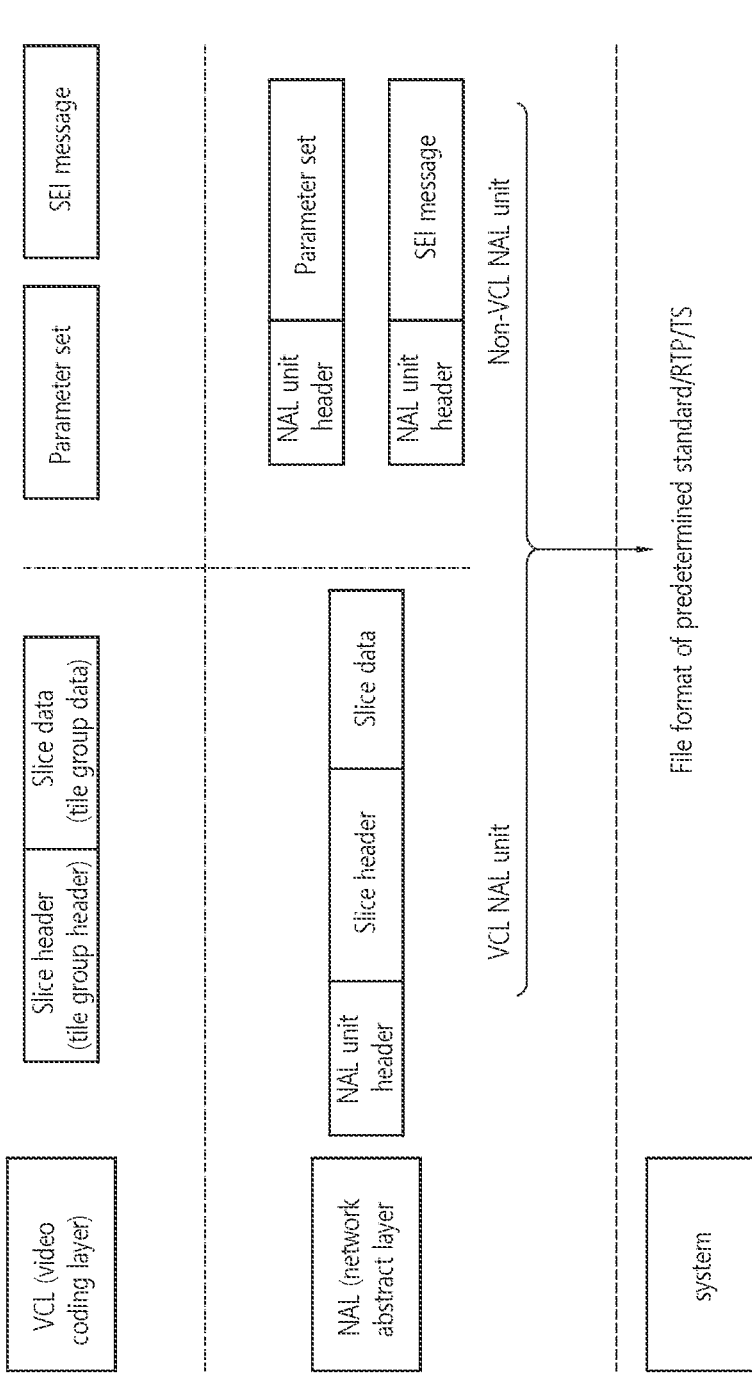
FIG. 4 exemplarily shows a hierarchical structure for coded video/image.

FIG. 4 exemplarily illustrates a hierarchical structure for the coded video/image.

Referring to FIG. 4, the coded video/image may be classified into a video coding layer (VCL) which deals with a decoding processing of videos/images and themselves, a subsystem for transmitting and storing encoded information, and a network abstraction layer which exists between the VCL and the subsystem and is in charge of a network adaption function.

For example, in the VCL. VCL data including compressed image data (slice data) may be generated or a parameter set including a picture parameter set (PPS), a sequence parameter set (SPS), a video parameter set (VPS), or a supplemental enhancement information (SEI) message additionally necessary for the image decoding process may be generated.

Further, for example, in the NAL, an NAL unit may be generated by adding header information (NAL unit header) to a raw byte sequence payload (RBSP) generated in the VCL. In this case, the RBSP may refer to the slice data, parameter set, and SEI message generated in the VCL. The NAL unit header may include NAL unit type information designated according to the RBSP data included in the corresponding NAL unit.

Further, for example, as illustrated in FIG. 4, the NAL unit may be classified into a VCL NAL unit and a non-VCL NAL unit according to the RBSP generated in the VCL. The VCL NAL unit may mean the NAL unit including information about the image (slice data), and the non-VCL NAL unit may mean the NAL unit including information necessary for the image decoding (parameter set or SEI message).

The aforementioned VCL NAL unit and non-VCL NAL unit may be transmitted through a network by attaching header information according to a data standard of the subsystem. For example, the NAL unit may be transformed into a predetermined data format of the standard, such as H.266/VVC file format, a real-time transport protocol (RTP), or a transport stream (TS), and transmitted through various networks.

Further, as described above, a NAL unit type may be designated for the NAL unit according to a data structure of the RBSP included in the corresponding NAL unit, and the information about the NAL unit type may be stored in and signaled to the NAL unit header.

For example, the NAL unit may be classified into a VCL NAL unit type and a non-VCL NAL unit type according to whether to include the information about the image (slice data). Further, the VCL NAL unit type may be classified according to the property and type of picture included in the VCL NAL unit, and the non-VCL NAL unit type may be classified according to the type of parameter set.

The following description may be an example of the NAL unit type designated according to the type of parameter set included in the non-VCL NAL unit type.

A decoding capability information (DCI) NAL unit: Type for the NAL unit including the DCI A video parameter set (VPS) NAL unit: Type for the NAL unit including the VPS A sequence parameter set (SPS) NAL unit: Type for the NAL unit including the SPS A picture parameter set (PPS) NAL unit: Type for the NAL unit including the PPS An adaptation parameter set (APS) NAL unit: Type for the NAL unit including the APS A picture header (PH) NAL unit: Type for the NAL unit including the PH The aforementioned NAL unit types may have syntax information about the NAL unit type, and the syntax information may be stored in and signaled to the NAL unit header. For example, the syntax information may be nal_unit_type, and the NAL unit type may be designated as a value of the nal_unit_type.

Meanwhile, as described above, one picture may include a plurality of slices, and the slice may include a slice header and a slice data. In this case, one picture header may be added to (embedded in) the plurality of slices (a set of the slice header and the slice data). The picture header (picture header syntax) may include information/parameters commonly applicable to the picture. The slice header (slice header syntax) may include information/parameters commonly applicable to the slice. The APS (APS syntax) or the PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to a plurality of layers. The DCI may include information/parameters that can be commonly applied throughout video. Additionally, the DCI may include information/parameters related to decoding capability. In the present disclosure, the high level syntax (HLS) may include, for example, at least one of the APS syntax, the PPS syntax, the SPS syntax, the VPS syntax, the DPS syntax, the picture header syntax, and the slice header syntax. In addition, in the present disclosure, low level syntax (LLS) may include, for example, at least one of the slice data syntax, the coding tree unit (CTU) syntax, the coding unit (CU) syntax, and the transform unit (TU) syntax.

In the present disclosure, image/video information encoded from the encoding apparatus to the decoding apparatus and signaled in bitstream form may include information related to partitioning within the picture, intra/inter prediction information, residual information, and in-loop filtering information. Additionally, the image/video information may include information of the slice header, information of the Picture header, information of the APS, information of the PPS, information of the SPS, information of the VPS, and/or information of the DCI. Additionally, the image/video information may further include general constraint information and/or NAL unit header information.

Meanwhile, as described above, information and/or syntax elements transmitted/signaled from the encoding apparatus to the decoding apparatus are encoded through the above-described encoding procedure and included in the bitstream, and the information and/or syntax elements signaled/received are decoded through the above-described decoding procedure and obtained from the bitstream. At this time, for example, the decoding apparatus can perform parsing, which is an operation of reading bits for each information and/or syntax element from the bitstream to decode the signaled/received information and/or syntax elements.

For example, each of the following coding descriptors may indicate a parsing process for a specific syntax element.

ae(v): A function that decodes a context-adaptive arithmetic entropy-coded syntax element (A function to decode syntax elements encoded with CABAC).

b(8): A function that reads a byte (8 bits) having any pattern of bit string. The parsing process for this descriptor can be specified by the return value of the function read_bits(8).

f(n): A function that reads a fixed-pattern bit string using n bits written from left to right with the left bit first. The parsing process for this descriptor can be specified by the return value of the function read_bits(n).

i(n): A function that decodes a syntax element coded as a signed integer using n bits. When n is "v" in the syntax table, the number of bits can vary in a manner dependent on the value of other syntax elements. The parsing process for this descriptor can be specified by the return value of the function read_bits(n) interpreted as a two's complement integer representation with most significant bit written first.

se(v): A function that decodes syntax elements encoded with signed integer 0-th order Exp-Golomb-coded syntax element with the left bit first. The parsing process for this descriptor can be specified with the order k equal to 0.

st(v): A null-terminated string encoded as universal coded character set (UCS) transmission format-8 (UTF-8) characters as specified in ISO/IEC 10646. The parsing process for this descriptor can be specified as follows. For example, st(v) can begin at a byte-aligned position in the bitstream and read and return a series of bytes from the bitstream, beginning at the current position and continuing up to but not including the next byte-aligned byte that is equal to 0x00, and advances the bitstream pointer by (stringLength+1)*8 bit positions, where stringLength is equal to the number of bytes returned. The st(v) syntax descriptor can be only used in this Specification when the current position in the bitstream is a byte-aligned position.

tu(v): A function that decodes syntax elements encoded as truncated unary code using up to max Val bits with max Val defined in the semantics of the syntax element.

u(n): A function that decodes a syntax element coded as an unsigned integer using n bits. When n is "v" in the syntax table, the number of bits can vary in a manner dependent on the value of other syntax elements. The parsing process for this descriptor can be specified by the return value of the function read_bits(n) interpreted as a binary representation of an unsigned integer with most significant bit written first.

ue(v): A function that decodes syntax elements encoded with unsigned integer 0-th order Exp-Golomb-coded syntax element with the left bit first. The parsing process for this descriptor can be specified with the order k equal to 0.

Meanwhile, as described above, the intra prediction modes may include two non-directional intra prediction modes and 65 directional prediction modes. The non-directional intra prediction modes may include a planar intra prediction mode and a DC intra prediction mode, and the directional intra prediction modes may include intra prediction modes numbered 2 to 66.

Figure 5:
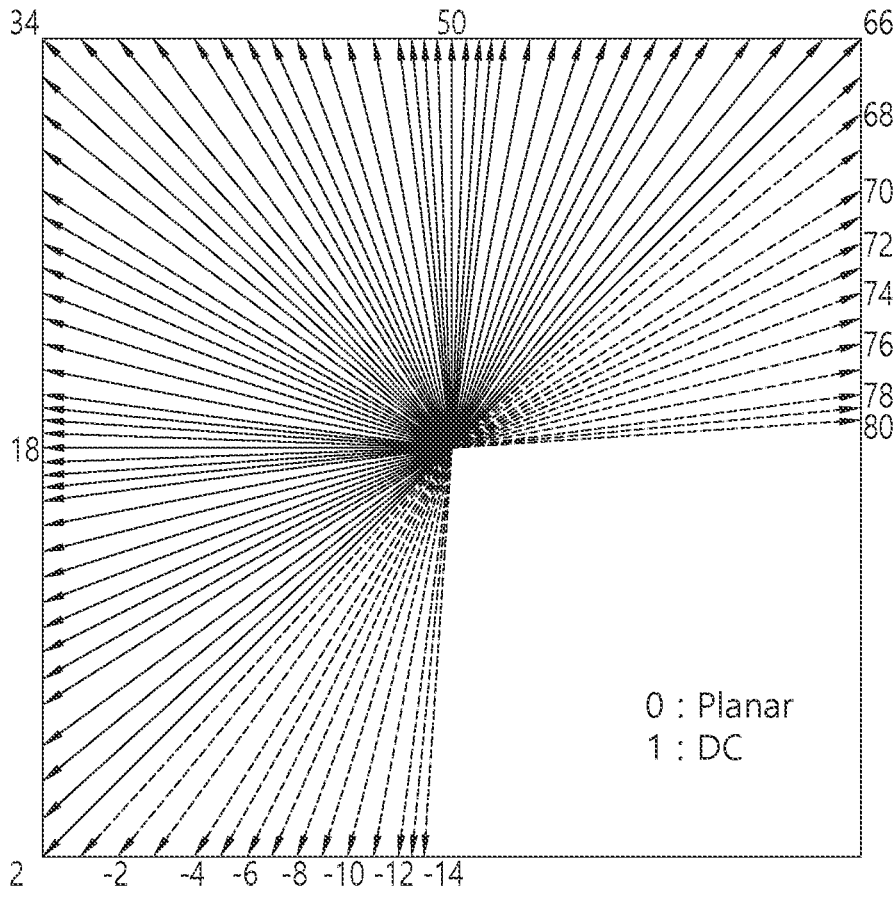
FIG. 5 exemplarily illustrates intra-directional modes of 65 prediction directions.

FIG. 5 exemplarily illustrates intra-directional modes of 65 prediction directions.

Referring to FIG. 5, it is possible to distinguish between intra prediction modes having horizontal directionality and intra prediction modes having vertical directionality centering on intra prediction mode 34 having an upward-left diagonal prediction direction. That is, intra prediction modes 2 to 33 have a horizontal direction, and intra prediction modes 34 to 66 have a vertical direction. The intra prediction mode 18 and the intra prediction mode 50 represent a horizontal intra prediction mode and a vertical intra prediction mode, respectively, the intra prediction mode 2 may represent a downward-left diagonal intra prediction mode, the intra prediction mode 34 may represent an top-left diagonal intra prediction mode, and the intra prediction mode 66 may represent an top-left diagonal intra prediction mode. The non-directional intra prediction modes may include a planar intra prediction mode of mode number 0 and a DC intra prediction mode of mode number 1.

Figure 6:
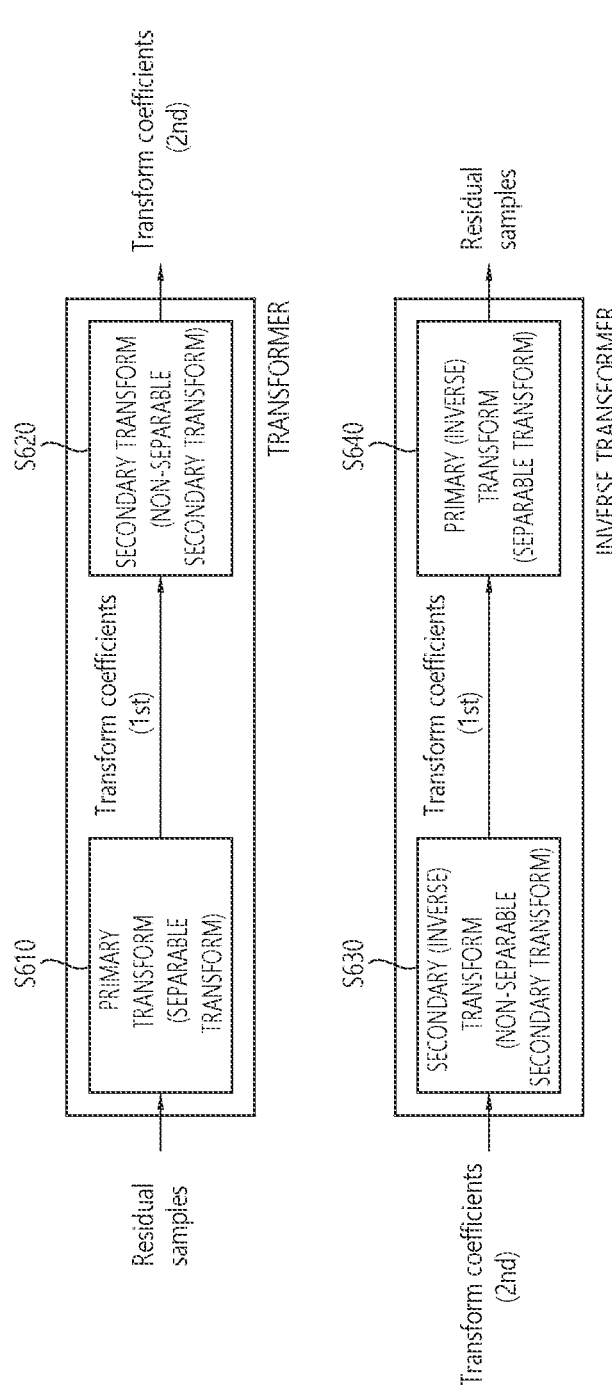
FIG. 6 schematically shows a transform technique according to an embodiment of the present disclosure.

FIG. 6 schematically illustrates a transform technique according to an embodiment of the present disclosure.

Referring to FIG. 6, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S610). This primary transform may be referred to as a core transform. Herein, the primary transform may be based on adaptive multiple transform selection (MTS), and when an adaptive multiple transform is applied as the primary transform, it may be referred to as an adaptive multiple core transform.

The adaptive multiple core transform may represent a method of transforming additionally using discrete cosine transform (DCT) type 2 and discrete sine transform (DST) type 7, DCT type 8, and/or DST type 1. That is, the adaptive multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the DCT type 2, the DST type 7, the DCT type 8, and the DST type 1 may be called a transform type, transform kernel or transform core. These DCT/DST transform types can be defined based on basis functions, and the basis functions can be expressed as the following table.

TABLE 1

| Transform Type | Basis function $T_i(j)$, i, j = 0, 1, . . . , N − 1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ |
| | where |
| | $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right),$ |
| | where |

TABLE 1-continued

| Transform Type | Basis function $T_i(j)$, i, j = 0, 1, . . . , N − 1 |
|---|---|
| | $\omega_0 = \begin{cases} \sqrt{\dfrac{2}{N}} & i = 0 \\ 1 & i \neq 0 \end{cases},$ |
| | $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

When the adaptive multiple core transform is performed, a vertical transform kernel and a horizontal transform kernel for a target block may be selected from among the transform kernels, a vertical transform may be performed on the target block based on the vertical transform kernel, and a horizontal transform may be performed on the target based on the horizontal transform kernel. Here, the horizontal transform may indicate a transform on horizontal components of the target block, and the vertical transform may indicate a transform on vertical components of the target block.

According to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST7, and a trTypeHor or trType Ver value of 2 may be set to DCT8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both trTypeHor and trTypeVer values are 2.

In one example, transform kernel sets according to MTS index information are illustrated in the following table.

TABLE 2

| tu mts idx[x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S620). If the primary transform is a transform from a spatial domain to a frequency domain, the secondary transform may be a transform from the frequency domain to the frequency domain. The secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST).

The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. For example, in case of the non-separable secondary transform, two-dimensional signals (transform coefficients) are re-arranged to a one-dimensional signal through a certain determined direction (e.g., row-first direction or column-first direction), and then modified transform coefficients (or secondary transform coefficients) are derived based on the matrix operation between this one-dimensional vector and the non-separable transform matrix.

For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. That is, for the non-separable secondaryc transform, the transform coefficients derived through the primary transform may be arranged in a one-dimensional vector according to the row-first order direction and then, the matrix operation may be performed to the transform coefficients, or arranged in a one-dimensional vector according to the column-first order direction, and then, the matrix operation may be performed to the transform coefficients.

The non-separable secondary transform may be applied to a top-left region of a block configured with (primary) transform coefficients (hereinafter, may be referred to as a transform coefficient block or a transform block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8,W)×min(8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min(8,W)×min(8,H) region of the transform coefficient block. In summary, the non-separable secondary transform may be applied to a 4×4 or 8×8 region at the top-left of the transform block according to the size of the transform block. According to an example, the transform for the top-left 4×4 region may be named a 4×4 transform, and the transform for the top-left 8×8 region may be referred to as an 8×8 transform.

Specifically, for example, when a 4×4 input block is used, NSST may be performed as follows.

For example, the 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \qquad \text{[Equation 1]}$$

At this time, when X is expressed in a vector form, vector $\vec{X}$ may be represented as Equation 2 below.

$$\vec{X} = [\, X_{00} \ \ X_{01} \ \ X_{02} \ \ X_{03} \ \ X_{10} \ \ X_{11} \ \ X_{12} \ \ X_{13} \ \ X_{20} \ \ X_{21} \ \ X_{22} \ \ X_{23} \ \ X_{30} \ \ X_{31} \ \ X_{32} \ \ X_{33} \,] \qquad \text{[Equation 2]}$$

In this case, the NSST may be calculated as Equation 3 below.

$$\vec{F} = T \cdot \vec{X} \qquad \text{[Equation 3]}$$

Here, $\vec{F}$ denotes a transform coefficient vector and T denotes a 16×16 (non-separable) transform matrix, and · means the multiplication of the matrix and the vector.

A 16×1 transform coefficient vector $\vec{F}$ may be derived through Equation 3, and $\vec{F}$ may be re-organized as a 4×4 block through a scan order (horizontal, vertical, diagonal, etc.). However, the above-described calculation is an example and can be used to reduce the computational complexity of the NSST, and hypercube-givens transform (HyGT) or the like may be used for the calculation of the NSST.

Meanwhile, in the NSST, a transform kernel (or transform core, transform type) may be selected mode-dependently. Here, the mode may include an intra-prediction mode and/or an inter-prediction mode.

That is, to select a transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform (RST), which will be described later, and may represent a non-separable transform for a low frequency component.

According to an example, the four transform sets according to the intra prediction mode may be mapped, for example, as shown in the following table.

TABLE 3

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

As shown in Table 3, the intra prediction modes may be mapped to any one of four transform sets, that is, IfnstTr-SetIdx may be mapped to any one among from 0 to 3.

On the other hand, when it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, Ifnst index value 0 may refer to a first non-separable secondary transform kernel, Ifnst index value 1 may refer to a second non-separable secondary transform kernel, and Ifnst index value 2 may refer to a third non-separable secondary transform kernel. Alternatively, Ifnst index value 0 may indicate that the first non-separable secondary transform is not applied to the target block, and Ifnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted. (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S630), and may obtain a residual block (residual samples) by performing a primary (inverse) transform on the (primary) transform coefficients (S640). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The inverse transformer may derive the modified transform coefficients by applying a transform kernel matrix to transformed (inverse quantized) transform coefficients arranged in a specific order, for example, in a diagonal scan order (specifically, a diagonal scan order starting from the top left corner of the transform block and proceeding in the bottom right direction). The modified transform coefficients may be arranged in two dimensions in the top left region of the transform block according to the direction in which the transform coefficients are scanned for the secondary transform in the transformer, that is, the row-first direction or the column-first direction. When the transformer performs the 4×4 transform, the inverse transformer may arrange the modified transform coefficients in two dimensions in the 4×4 region of the transform block, and when the transformer performs the 8×8 transform, the inverse transformer may arrange the modified transform coefficients in two dimensions in the 8×8 region of the transform block.

Meanwhile, the secondary inverse transform may be NSST, reduced secondary transform (RST) or LFNST, and whether to apply the secondary inverse transform may be determined based on a secondary transform flag parsed from a bitstream. As another example, whether to apply the secondary inverse transform may be determined based on transform coefficients of the residual block.

This secondary inverse transform (i.e. transform kernel, transform matrix or transform kernel matrix) may be determined based on the LFNST (NSST or RST) transform set specified according to the intra prediction mode. Also, as an embodiment, the secondary transform determination method may be determined depending on the primary transform determination method. Depending on the intra prediction mode, various combinations of primary transform and secondary transform may be determined. Also, for example, a region to which a secondary inverse transform is applied may be determined based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform. In addition, since the RST is mainly performed in a low-frequency region including non-zero coefficients in a transform block, it may be referred to as a low-frequency non-separable transform (LFNST). The non-separable secondary transform index may be named LFNST index.

In this disclosure, the LFNST may mean a transform performed on residual samples of a target block based on a transform matrix having a reduced size. When the reduced transform is performed, the amount of computation required for transform may be reduced due to the reduction in the size of the transform matrix. That is, the LFNST can be used to solve the computational complexity issue that occurs when transforming or non-separable transforming a large block.

Meanwhile, when the secondary inverse transform is performed based on LFNST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present disclosure, deriving a transform coefficient based on a transform may refer to deriving a transform coefficient by applying the transform.

Figure 7:
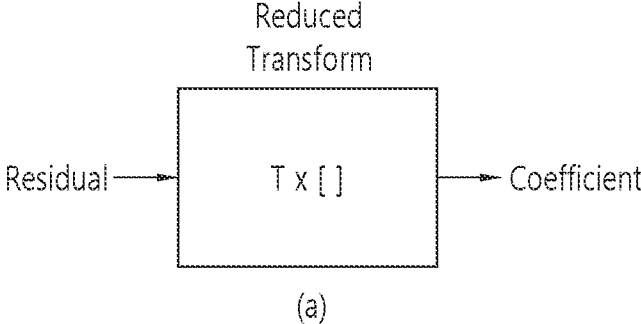
FIG. 7 is a diagram for explaining RST according to an embodiment of the present disclosure.
Figure 7:
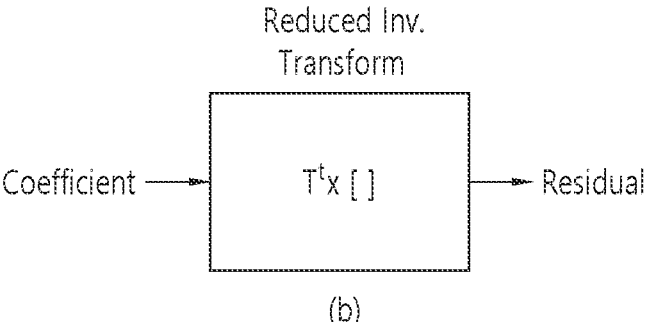

FIG. 7 is a diagram illustrating an RST or an LFNST applied to the RST according to an embodiment of the present disclosure.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, reduced factor, simple factor or other various terms. Meanwhile, R may be referred to as a reduced coefficient, but according to circumstances, the reduced factor may mean R. Further, according to circumstances, the reduced factor may mean the N/R value.

The size of the reduced transform matrix according to an example may be R×N less than N×N, the size of a conventional transform matrix, and may be defined as in Equation 4 below.

$$T_{R \times N} = \begin{bmatrix} t_{11} & t_{12} & t_{13} & & t_{1N} \\ t_{21} & t_{22} & t_{23} & \cdots & t_{2N} \\ \vdots & & \ddots & \\ t_{R1} & t_{R2} & t_{R3} & \cdots & t_{RN} \end{bmatrix} \quad \text{[Equation 4]}$$

The matrix T in the Reduced Transform block shown in (a) of FIG. 7 may mean the matrix $T_{R \times N}$ of Equation 4. As shown in (a) of FIG. 7, when the reduced transform matrix $T_{R \times N}$ is multiplied to residual samples for the target block, transform coefficients for the target block may be derived.

In an example, if the size of the block to which the transform is applied is 8×8 and R=16 (i.e., R/N=16/64=¼), then the RST according to (a) of FIG. 7 may be expressed as a matrix operation as shown in Equation 5 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & & t_{1,64} \\ t_{2,1} & t_{2,2} & t_{2,3} & \cdots & t_{2,64} \\ \vdots & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix} \quad \text{[Equation 5]}$$

In Equation 5, $r_1$ to $r_{164}$ may represent residual samples for the target block and may be specifically transform coefficients generated by applying a primary transform. As a result of the calculation of Equation 5 transform coefficients ci for the current block may be derived, and a process of deriving $c_i$ may be as in Equation 6.

| Equation 6 |
|---|
| for i from to R: |
| ci=0 |
| for j from 1 to N |
| ci + = tij * rj |

As a result of the calculation of Equation 6, transform coefficients $c_1$ to $c_R$ for the target block may be derived. That is, when R=16, transform coefficients $c_1$ to $c_{16}$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the LFNST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix $T_{N \times R}$ according to an example is N×R less than the size N×N of the regular inverse transform matrix, and is in a transpose relationship with the reduced transform matrix $T_{R \times N}$ shown in Equation 4.

The matrix $T^t$ in the Reduced Inv. Transform block shown in (b) of FIG. 7 may mean the inverse RST matrix $T_{R \times N}^T$ (the superscript T means transpose). When the inverse RST matrix $T_{R \times N}^T$ is multiplied to the transform coefficients for the target block as shown in (b) of FIG. 7, the modified transform coefficients for the target block or the residual samples for the target block may be derived. The inverse RST matrix $T_{R \times N}^T$ may be expressed as $(T_{R \times N})^T {}_{N \times R}$.

More specifically, when the inverse RST is applied as the secondary inverse transform, the modified transform coefficients for the target block may be derived when the inverse RST matrix $T_{R \times N}{}^T$ is multiplied to the transform coefficients for the target block.

Meanwhile, according to an example, the inverse RST may be applied as the inverse primary transform, and in this case, the residual samples for the target block may be derived when the inverse RST matrix $T_{R \times N}{}^T$ is multiplied to the transform coefficients for the target block.

In an example, if the size of the block to which the inverse transform is applied is 8×8 and R=16 (i.e., R/N=16/64=¼), then the RST according to (b) of FIG. 7 may be expressed as a matrix operation as shown in Equation 7 below.

$$\begin{bmatrix} t_{1,1} & t_{2,1} & & t_{16,1} \\ t_{1,2} & t_{2,2} & \cdots & t_{16,2} \\ t_{1,3} & t_{2,3} & & t_{16,3} \\ \vdots & \vdots & & \vdots \\ & & \ddots & \vdots \\ t_{16,1} & t_{16,2} & \cdots & t_{16,64} \end{bmatrix} \times \begin{bmatrix} c_1 \\ c_2 \\ \vdots \\ c_{16} \end{bmatrix} \qquad \text{[Equation 7]}$$

In Equation 7, $c_1$ to $c_{16}$ may represent transform coefficients of the target block, that is, transform coefficients derived through residual coding. As a result of the operation of Equation 7, $r_i$ representing modified transform coefficients of the target block or residual samples of the target block may be derived, and the derivation process of $r_i$ may be the same as Equation 8.

---

Equation 8

---

For i from 1 to N
 $r_i = 0$
  for j from 1 to R
   $r_i + = t_{ji} * c_j$

---

As a result of the operation of Equation 8, $r_1$ to $r_N$ indicating modified transform coefficients of the target block or residual samples of the target block may be derived. Since N is 64 in Equation 7, 64 modified transform coefficients can be derived through Equation 8.

Considering the size of the inverse transform matrix, the size of the normal inverse transform matrix is 64×64 (N×N), but the size of the reduced inverse transform matrix is reduced to 64×16 (N×R), and compared to performing the normal inverse transform, the memory usage can be reduced by R/N ratio when performing the inverse RST. In addition, compared to the number of multiplication operations N×N when using the normal inverse transform matrix, the number of multiplication operations can be reduced by an R/N ratio (N×R) when a reduced inverse transform matrix is used. A reduced inverse transform matrix or inverse transform matrix may also be named a reduced transform matrix or a transform matrix if it is not confusing whether it is a transform or an inverse transform.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients.

That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. In this embodiment, the column vectors of Equation 8 are $r_1$ to $r_{48}$, the size of the transform matrix is 16×48, and 16 modified transform coefficients ($c_1$ to $c_{16}$) are derived through matrix operation.

At this time, a 48×1 vector can be configured by appropriately arranging 48 pieces of data constituting an 8×8 region. For example, a 48×1 vector may be constructed based on 48 pieces of data constituting an region excluding the 4×4 region at the bottom right of the 8×8 region. At this time, when matrix operation is performed by applying the maximum 16×48 transform kernel matrix, 16 modified transform coefficients are generated. The 16 modified transform coefficients can be arranged in the top left 4×4 region according to the scanning order, and the top right 4×4 region and the bottom left 4×4 region can be filled with zeros.

For the inverse transform of the decoding process, a transposed matrix of the transform kernel matrix described above may be used. That is, when inverse RST or inverse LFNST is performed as an inverse transform process performed by the decoding apparatus, the input coefficient data to which the inverse RST is applied is composed of a 1-dimensional vector according to a predetermined arrangement order (diagonal scanning order), and the modified coefficient vector obtained by multiplying the 1-dimensional vector by the corresponding inverse RST matrix from the left side may be arranged in a 2-dimensional block according to a predetermined arrangement order.

If RST or LFNST is performed in the 8×8 region and inverse RST or inverse LFNST is performed, the size of the transform matrix of Equation 7 is 48×16, the column vector includes $c_1$ to $c_{16}$, and 48 modified transform coefficients ($r_1$ to $r_{48}$) are derived through the matrix operation.

In summary, in the transform process performed by the encoding apparatus, when RST or LFNST is applied to the 8×8 region, the matrix operation of the 48 transform coefficients of the top left, top right, and bottom left regions of the 8×8 region excluding the bottom right region of the 8×8 region among the transform coefficients of the 8×8 region and the 16×48 transform kernel matrix is performed. For the matrix operation, the 48 transform coefficients are input as a one-dimensional array. When this matrix operation is performed, 16 modified transform coefficients are derived, and the 16 modified transform coefficients may be arranged in the top left region of the 8×8 region.

Conversely, in the inverse transform process performed by the encoding apparatus or the decoding apparatus, when the inverse RST or LFNST is applied to the 8×8 region, 16 transform coefficients at the top left of the 8×8 region among the transform coefficients of the 8×8 region may be input in the form of a 1-dimensional array according to a scanning order and subjected to matrix operation with a 48×16 transform kernel matrix. That is, the matrix operation in this case can be expressed as (48×16 matrix)*(16×1 transform coefficient vector)=(48×1 modified transform coefficient vector). Here, since the n×1 vector can be interpreted in the same sense as an n×1 matrix, it can also be expressed as an n×1 column vector. Also, * means matrix multiplication operation. When this matrix operation is performed, the 48 modified transform coefficients can be derived, and the 48 modified transform coefficients can be arranged in the top left, top right, and bottom left regions of the 8×8 region except for the bottom right region.

Meanwhile, for example, the encoding apparatus may derive the bitstream by encoding the value of the syntax element or the quantized values of the transform coefficient for the residual based on various coding methods, such as exponential Golomb, context-adaptive variable length coding (CAVLC), context-adaptive binary arithmetic coding (CABAC), and the like. Further, the decoding apparatus may derive the value of the syntax element or the quantized values of the transform coefficient for the residual based on various coding methods, such as exponential Golomb encoding, CAVLC, CABAC, and the like.

For example, the above-described coding methods may be performed as the contents to be described later.

Figure 8:
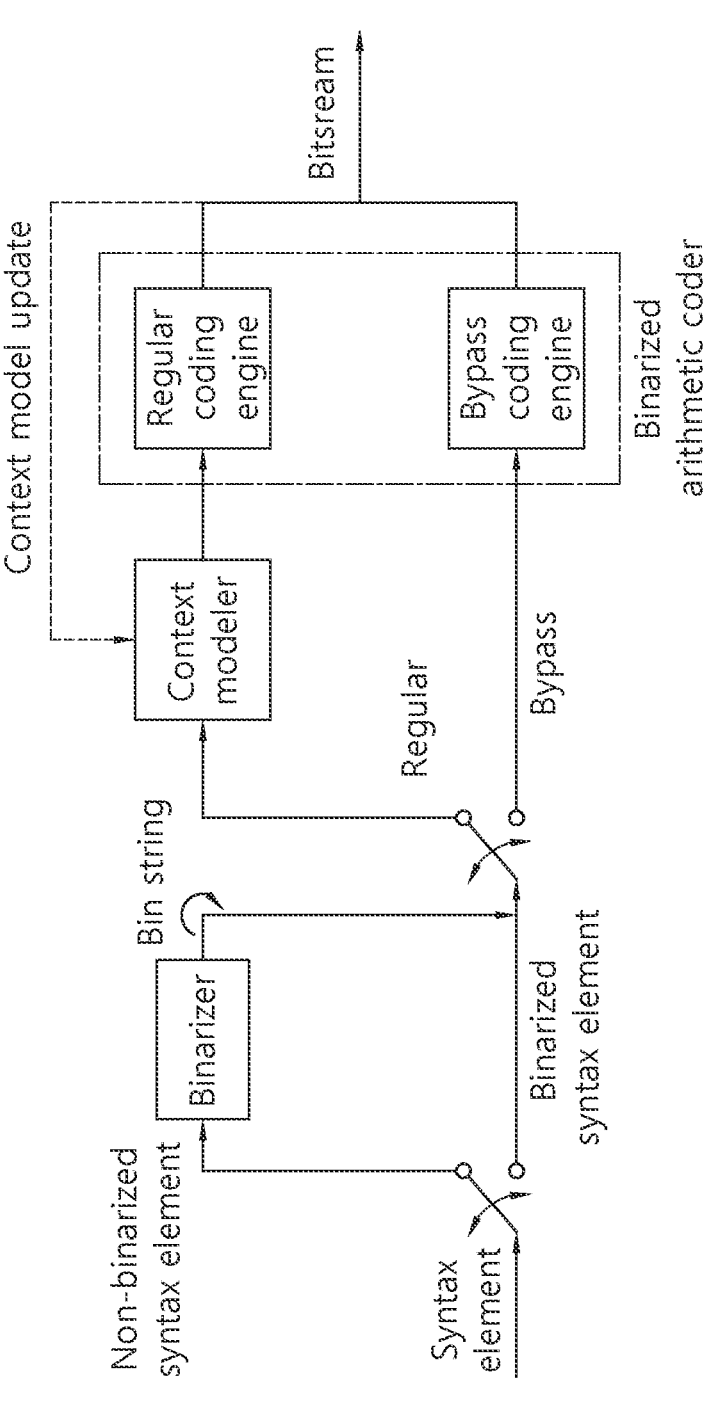
FIG. 8 exemplarily shows context-adaptive binary arithmetic coding (CABAC) for encoding syntax elements.

FIG. 8 exemplarily illustrates context-adaptive binary arithmetic coding (CABAC) for encoding a syntax element.

For example, in a CABAC coding process, if an input signal is a syntax element that is not a binary value, a value of the input signal may be transformed into a binary value through binarization. Further, if the input signal is already the binary value (i.e., if the value of the input signal is the binary value), the binarization may not be performed, but the input signal may be used as it is Here, each binary number 0 or 1 constituting the binary value may be called a bin. For example, if a binary string after the binarization is 110, each of 1, 1, and 0 may be represented as one bin. The bin(s) for one syntax element may represent the value of the syntax element. The binarization may be based on various binarization method, such as a truncated rice binarization process or a fixed-length binarization process, and the binarization method for a target syntax element may be predefined. The binarization procedure may be performed by a binarizer in an entropy encoder.

Thereafter, the binarized bins of the syntax element may be input to a regular coding engine or a bypass coding engine. The regular coding engine of the encoding apparatus may allocate a context model that reflects a probability value with respect to the corresponding bin, and encode the corresponding bin based on the allocated context model. The regular coding engine of the encoding apparatus may update the context model for the corresponding bin after performing coding with respect to the respective bins. The bins being coded as the above-described contents may be represented as context-coded bins.

Meanwhile, in case that the binarized bins of the syntax element are input to the bypass coding engine, they may be coded as follows. For example, the bypass coding engine of the encoding apparatus may omit a procedure for estimating probability with respect to the input bin and a procedure for updating a probability model having been applied to the bin after the coding. In case that the bypass coding is applied, the encoding apparatus may code the input bin by applying regular probability distribution instead of allocating the context model, and through this, the coding speed can be improved. The bin being coded as the above-described contents may be represented as a bypass bin.

Entropy decoding may represent a process for performing the same process as the above-described entropy encoding in reverse order.

The decoding apparatus (entropy decoder) may decode encoded image/video information. The image/video information may include partitioning-related information, prediction-related information (e.g., inter/intra prediction division information, intra prediction mode information, inter prediction mode information, and the like), residual information, or in-loop filtering-related information, or may include various syntax elements thereabout. The entropy coding may be performed in the unit of a syntax element.

The decoding apparatus may perform binarization of target syntax elements. Here, the binarization may be based on various binarization methods, such as a truncated rice binarization process or a fixed-length binarization process, and the binarization method for the target syntax element may be predefined. The decoding apparatus may derive available bin strings (bin string candidates) for available values of the target syntax elements through the binarization procedure. The binarization procedure may be performed by the binarizer in the entropy decoder.

The decoding apparatus may compare the derived bin string with available bin strings for the corresponding syntax elements while sequentially decoding or parsing the respective bins for the target syntax elements from input bit(s) in the bitstream. If the derived bin string is equal to one of the available bin strings, the value corresponding to the corresponding bin string is derived as the value of the corresponding syntax element. If not, the decoding apparatus may re-perform the above-described procedure after further parsing the next bit in the bitstream. Through such a process, it is possible to perform signaling of specific information (or specific syntax element) in the bitstream using a variable length bit even without using a start bit or an end bit of the corresponding information. Through this, a relatively smaller bit may be allocated with respect to a smaller value, and thus an overall coding efficiency can be enhanced.

The decoding apparatus may perform context model-based or bypass-based decoding of the respective bins in the bin string from the bitstream based on an entropy coding technique, such as CABAC or CAVLC.

In case that the syntax element is decoded based on the context model, the decoding apparatus may receive the bin corresponding to the syntax element through the bitstream, may determine a context model using the syntax element and decoding information of the decoding target block or the neighboring block or symbol/bin information decoded in the previous stage, and may derive the syntax element value by performing arithmetic decoding of the bin through prediction of the probability of occurrence of the received bin in accordance with the determined context model. Thereafter, the context model of the bin being next decoded may be updated based on the determined context model.

The context model may be allocated and updated by context-coded (regularly coded) bins, and the context model may be indicated based on context index (ctxIdx) or context index increment (ctxInc). CtxIdx may be derived based on ctxInc. Specifically, for example, the ctxIdx representing the context model for each of the regularly coded bins may be derived by the sum of ctxInc and context index offset (ctxIdxOffset). For example, the ctxInc may be differently derived by bins. The ctxIdxOffset may be represented as the lowest value of the ctxIdx. Generally, the ctxIdxOffset may be a value being used to distinguish the same from context models for other syntax elements, and the context model for one syntax element may be divided or derived based on the ctxInc.

In the entropy encoding procedure, it may be determined whether to perform encoding through the regular coding engine or to perform encoding through the bypass coding engine, and accordingly, a coding path may be switched. Entropy decoding may perform the same process as the entropy encoding in reverse order.

Meanwhile, for example, in case that the syntax element is bypass-decoded, the decoding apparatus may receive the bin corresponding to the syntax element through the bitstream, and may decode the input bin by applying regular probability distribution. In this case, the decoding apparatus may omit a procedure of deriving the context model of the syntax element and a procedure of updating the context model applied to the bin after the decoding.

Meanwhile, as described above, conventionally, when adaptive multiple transform selection (MTS) is applied, transform coefficients may be generated by applying a primary transform, which is a transform from the spatial domain to the frequency domain, based on DCT type 2. DST type 7, and DCT type 8 to the residual signal (or residual block). This adaptive multiple transform was a form of a separable transform in which one kernel was applied in the horizontal direction and one kernel was applied in the vertical direction.

That is, only the separable transform is applied to the existing primary transform, and the non-separable transform is not applied, but the non-separable transform (kernel) generally provides higher coding efficiency than the separable transform (kernel). Accordingly, hereinafter, various embodiments related to the primary transform, including the separable transform and the non-separable transform.

According to one embodiment, the primary transform may include a non-separable transform.

As an example DCT type 2 and the non-separable (primary) transform kernel can be used for the primary transform. Or, as an example, the non-separable (primary) transform kernel may be used in addition to the existing DCT Type 2, DST Type 7, and DCT Type 8. Or, as an example, one or more of the existing DCT Type 2, DST Type 7, and DCT Type 8 kernels may be replaced with a non-separable (primary) transform kernel. However, this is only an example and can be applied even when the configuration of the existing transform kernel described above is different. In other words, it can be applied even when other types of DCT/DST or transform skip are included.

Relatedly, the non-separable primary transform can generate transform coefficients for the residual signals by transforming the residual signals based on the non-separable transform matrix. That is, unlike existing transform methods that apply vertical and horizontal transforms separately (or horizontal and vertical transform independently), transform can be performed at once using the non-separable transform matrix.

For example, the non-separable primary transform may be performed in the same manner as the non-separable secondary transform method described above with reference to FIG. 6.

For example, when the non-separable primary transform is applied to a 4×4 input block, the 4×4 input block X may be equal to Equation 1 above. At this time, when the X is expressed in vector form, the vector $\vec{X}$ may be equal to Equation 2 above. In this case, the non-separable primary transform can be calculated as in Equation 3 above.

A 16×1 transform coefficient vector $\vec{F}$ can be derived through Equation 3, and $\vec{F}$ may be reconstructed into a 4×4 block according to the scan order (e.g. horizontal, vertical, diagonal, or predetermined/pre-stored scan order). However, the above-described calculation is only an example, and optimized non-separable transform calculation methods can be used to reduce the computational complexity of the non-separable primary transform.

Meanwhile, the transform set and the transform kernel for the non-separable primary transform may be configured in various ways depending on mode (ex. intra prediction mode, inter prediction mode, etc.), width of the input block, height of the input block, and number of pixels of the input block, the sub-block location within the block, explicitly signaled syntax elements, statistical characteristics of neighboring pixels, and/or whether secondary transform is used, etc. That is, the transform set and the transform kernel for the non-separable primary transform may be selected based on at least one of the mode (ex. intra prediction mode, inter prediction mode, etc.), the width of the input block, the height of the input block, and the number of pixels of the input block, the sub-block location within the block, the explicitly signaled syntax elements, statistical the characteristics of neighboring pixels, and/or whether secondary transform is used, etc.

For example, when intra prediction is applied to the current block, n sets may be grouped based on intra prediction modes, and each set may be configured to include k transform kernels. At this time, according to the present disclosure, the number of intra prediction modes and grouping method are not limited to a specific value or method.

Or, for example, the non-separable primary transform set and the non-separable primary transform kernel may be determined based on the width and/or height of the input block. For example, a 4×4 input block may be configured to include $n_1$ sets and $k_1$ transform kernels in each set, and a 4×8 input block may be configured to include $n_2$ sets and $k_2$ transform kernels in each set.

As another example, for relatively large blocks, non-separable transform according to the width and height of the block may not be used. That is, as an example, the block may be separated into small blocks (i.e. subblocks) in the spatial domain, and the non-separable primary transform may be performed according to the width and height of the separated small blocks (i.e., subblocks). For example, when performing non-separable transform on a 4×8 block, the 4×8 block can be separated into two 4×4 sub-blocks in the spatial domain, and the non-separable primary transform based on the 4×4 block may be performed on each 4×4 subblock. As another example, an 8×16 block may be separated into two 8×8 sub-blocks in the spatial domain, and the non-separable primary transform based on the 8×8 block may be performed on each 8×8 sub-block.

The transformer may perform the non-separable primary transform based on the selected transform kernel and obtain transform coefficients. The obtained transform coefficients may be subjected to the secondary transform, or may be derived as quantized transform coefficients by the quantizer without performing the secondary transform. Then, the quantized transform coefficients may be encoded and signaled to the decoding apparatus, and the quantized transform coefficients may be transmitted to the inverse quantizer/inverse transformer of the encoding apparatus. The inverse transformer may perform a series of procedures in the reverse order of the procedures performed in the above-described transformer. The inverse transformer may receive (dequantized) transform coefficients and perform the inverse secondary transform, or may obtain a residual block (residual samples) by performing the inverse primary transform without performing the inverse secondary transform. Additionally, the encoding apparatus and the decoding apparatus may generate a reconstructed block based on the residual block and the predicted block, and generate a reconstructed picture based on this.

In this way, by configuring the primary transform to include the non-separable transform as in the above-described embodiment, higher coding efficiency can be expected than the conventional primary transform including only the separable transform.

According to one embodiment, when the primary transform includes both the separable transform and the non-separable transform, information related to the primary transform can be efficiently signaled as follows.

As described above, the primary transform based on the separable transform includes DCT type 2, DST type 7, DCT type 8, DCT type 5, DST type 4, DST type 1, identity transform (IDT), or other transforms (ex. transform skip) that are not the non-separable transform. In the case of the separable transform, there are generally several selectable transforms, and in the case of the non-separable transform, the computational complexity or memory requirements may be relatively greater than that of the separable transform, so the number of non-separable transforms that may be selected may be one or more.

For example, if the number of non-separable transform kernels applicable to the primary transform is one and the number of separable transform kernels applicable to the primary transform is multiple, transform index information for the primary transform may be signaled as follows. In relation to this, the value of transform index information may have the same meaning as the transform index.

For example, the transform index for the non-separable transform may be set to 0, and the transform index for the separable transform may be set from 1. That is, the value of the transform index information related to the non-separable transform kernel may be set to 0, and the values of the transform index information related to the separable transform kernels may be set from 1.

That is, as an example, when a plurality of transform kernels applied to the primary transform include one non-separable transform kernel and M separable transform kernels, the value of the transform index information related to the one non-separable transform kernel may be 0, and the values of transform index information related to the M separable transform kernels may be from 1 to M. At this time, as an example M may be a positive integer greater than 1.

For example, if there are five possibilities for separable transform, transform index 0 may indicate the non-separable transform, and transform indices 1 to 5 may indicate predefined separable transforms. That is, when the number of separable transform kernels is 5, transform index information with a value of 0 may indicate the non-separable transform, and transform index information with values from 1 to 5 may each indicate the predefined separable transform. Accordingly, any one transform index value from 0 to 5 may be signaled from the encoding apparatus (encoder) to the decoding apparatus (decoder). In addition, the decoding apparatus (decoder) may determine whether the non-separable transform or the separable transform is used through the decoded transform index, and may determine which of the plurality of separable transforms (kernels) was used.

As another example, the transform index for the non-separable transform may be set to a predefined N, and the transform index for the separable transform may be defined according to the order excluding N from 0 to the predefined maximum index value M (however, M>=N). That is, the value of the transform index information related to the non-separable transform kernel may be set to the predefined N, and the values of the transform index information related to the separable transform kernels may be defined according to the order excluding N from 0 to the predefined maximum index value M.

That is, as an example, when the plurality of transform kernels include one non-separable transform kernel and M separable transform kernels, the value of transform index information related to the one non-separable transform kernel may be N, and the values of transform index information related to the M separable transform kernels may be from 0 to N−1 and from N+1 to M. At this time, as an example M may be a positive integer greater than 1, and N may be a positive integer less than M.

For example, if the number of available separable transforms is 5 and the transform index for the non-separable transform is predefined as 3(N), the transform index for the separable transform may be assigned according to a predetermined order from 0 to 5, with 3 being skipped. That is, if the number of separable transform kernels is 5 and the value of the transform index information related to the non-separable transform kernel is predefined as 3, the value of the transform index information related to the separable transform kernel may be assigned according to the predetermined order from 0 to 5. However, 3 may be skipped and assigned. Accordingly, any one transform index value from 0 to 5 may be signaled from the encoding apparatus (encoder) to the decoding apparatus (decoder). In addition, the decoding apparatus (decoder) may determine whether the non-separable transform or the separable transform is used through the decoded transform index, and may determine which of the plurality of separable transform (kernels) was used.

As another example, a flag indicating whether the non-separable transform is used may be signaled before signaling the transform index information for the primary transform. For example, if the value of the flag indicating whether the non-separable transform is used is 0, transform index information for the separable transform may be additionally signaled. For example, when the value of the flag is 1, the transform index information for the primary transform may be signaled according to the above-described examples applied when the number of non-separable transform kernels is one and the number of separable transform kernels is multiple.

That is, as an example, the encoded information may include the flag indicating whether the non-separable transform kernel is applied to the primary transform. For example, a value of 0 of the flag may indicate that the non-separable transform kernel is not applied to the primary transform, and a value of 1 of the flag may indicate that the non-separable transform kernel is applied to the primary transform. Additionally, for example, when the value of the flag is 0, the transform index information for the primary transform may be related only to the separable transform kernel. In other words, the value of the flag being 0 indicates that the non-separable transform kernel is not applied to the primary transform, so the transform index information for the primary transform may be related only to the separable transform kernel.

At this time, for example, the value of the flag indicating whether the non-separable transform may be coded by predicting the probability through a context coded bin. That is, the flag may be context coded based on a context model. At this time, for example, the context model for probability prediction may be constructed using the size of the current block, the shape of the current block, the intra prediction mode applied to the current block, and/or information on previously coded blocks.

Additionally, for example, transform index (or transform index related to the separable transform kernel) information may be binarized based on fixed length coding (FLC) or truncated binary code (TBC). At this time, the transform index may be coded based on context coding. For example, the transform index information may be coded based on context coding or bypass coding.

That is, for example, the transform index (or transform index related to the separable transform kernel) value for the primary transform may be binarized based on FLC or TBC, and may be coded through context coding (coding by treating it as a context coded bin) or bypass coding (coding by treating it as a bypass coded bin).

Or, for example, the transform index information for the primary transform may be binarized based on a truncated unary code (TU code). At this time, for example, the transform index information may be coded based on context coding or bypass coding.

That is, for example, the transform index value for the primary transform may be expressed through TU binarization, and may be coded by predicting the probability of occurrence through context coding, or may be coded with the same probability through bypass coding.

For example, when the number of non-separable transform kernels applicable to the primary transform is 2 or more and the number of separable transform kernels is multiple, transform index information for the primary transform may be signaled as follows. Likewise, the value of transform index information may have the same meaning as the transform index.

For example, before signaling the transform index information for the primary transform, a flag indicating whether the non-separable transform is used may be signaled. For example, if the value of the flag indicating whether the non-separable transform is used is 1, transform index information related to the non-separable transform kernel can be additionally signaled, and if the value of the flag is 0, the transform index information related to the separable transform kernel can be additionally signaled.

That is, as described above, the encoded information may include a flag indicating whether the non-separable transform kernel is applied to the primary transform. For example, as described above, a value of 0 of the flag may indicate that the non-separable transform kernel is not applied to the primary transform, and a value of 1 of the flag may indicate that the non-separable transform kernel is applied to the primary transform. Additionally, for example, when the value of the flag is 0, the transform index information for the primary transform may be related to the separable transform kernel, and when the value of the flag is 1, the transform index information for the primary transform may be related to the non-separable transform kernel. In other words, the value of the flag being 0 indicates that the separable transform kernel is applied to the primary transform, so the transform index information for the primary transform may be related to the separable transform kernel, and the value of the flag being 1 indicates that the non-separable transform kernel is applied to the primary transform, so the transform index information for the primary transform may be related to the non-separable transform kernel.

That is, for example, based on the plurality of transform kernels including L non-separable transform kernels and M separable transform kernels, and the value of the flag being 1, the transform index information may be related to the non-separable transform kernel, and L and M may be positive integers greater than 1.

At this time, for example, transform index information related to the non-separable transform kernel or transform index information related to the separable transform kernel may be binarized based on FLC or TBC and may be coded based on context coding or bypass coding.

That is, for example, transform index information related to the non-separable transform kernel or transform index information related to the separable transform kernel may be binarized based on FLC or TBC, and may be coded through context coding (coded by treating it as a context coded bin) or bypass coding (coded by treating it as a bypass coded bin).

Alternatively, the transform index information related to the non-separable transform kernel or the transform index information related to the separable transform kernel may be binarized based on a TU code and coded based on context coding or bypass coding.

That is, for example, the transform index information related to the non-separable transform kernel or the transform index information related to the separable transform kernel may be expressed through TU binarization, and may be coded by predicting the probability of occurrence through context coding, or may be coded with the same probability through bypass coding.

At this time, for example, the value of the flag indicating whether the non-separable transform may be coded by predicting the probability through a context coded bin, as described above. That is, the flag may be context coded based on the context model. At this time, for example, the context model for probability prediction may be constructed using the size of the current block, the shape of the current block, the intra prediction mode applied to the current block, and/or information on previously coded blocks.

As another example, rather than separately signaling the flag indicating whether the non-separable transform is used, transform index information for all transform kernels applied to the primary transform may be signaled at once. For example, if the number of non-separable transform kernels is L and the number of available separable transform kernels is M, transform index values 0 to L−1 may each represent predetermined L non-separable transform kernels, and transform index values starting from L to L+M−1 may each represent M predetermined separable transform kernels. That is, for example, transform index values 0 to L−1 may correspond to non-separable transform kernels 0 to L−1, and transform index values L to L+M−1 may correspond to separable transform kernels 0 to M−1.

That is, as an example, when the plurality of transform kernels applied to the primary transform include L, non-separable transform kernels and M separable transform kernels, the values of transform index information related to the L non-separable transform kernels may be from 0 to L−1, and the values of transform index information related to the M separable transform kernels may be from L to L+M−1. At this time, as an example, L and M may be positive integers greater than 1.

This method of mapping the transform index for the primary transform to the available separable transform kernels and the non-separable transform kernels can be applied in various predefined forms in addition to the cases described above.

For example, in the above-described cases where the number of non-separable transform kernels is one or multiple and the number of separable transform kernels is multiple, the transform index related to the separable transform may be signaled by determining transform applied in the horizontal and vertical directions according to predetermined rules. Or, for example, the transform index related to the separable transform may be transmitted separately into a separable transform index for the horizontal direction and a separable transform index for the vertical direction, and the transform specified by each transform index may be applied to the corresponding direction.

In this way, by efficiently signaling information related to the primary transform as in the above embodiment, the effect of reducing the number of bits and improving coding performance can be expected.

According to one embodiment, when the primary transform includes both the separable transform and the non-separable transform, the primary transform and the secondary transform can be efficiently applied as follows.

As described above, the separable transform and the non-separable transform may be applied to the primary transform, and the primary transform method based on the separable transform may includes DCT type 2, DST type 7, DCT type 8, DCT type 5, DST type 4, DST type 1, identity transform (IDT), or other transforms (ex. transform skip) that are not the non-separable transform. Additionally, another non-separable transform different from the primary transform may be applied to the secondary transform.

Relatedly, since the non-separable transform has greater computational complexity or memory requirements than the separable transform, when the non-separable transform is applied to the primary transform, it is necessary to control the computational complexity of the worst case for the application of the primary transform and the secondary transform.

As a specific example, the following efficient transform structure is proposed.

For example, when the non-separable transform is applied to the primary transform, from the perspective of the encoding apparatus (encoder), the use of the secondary transform, which is a non-separable transform, can be restricted, and from the perspective of the decoding apparatus (decoder), when the secondary transform is applied, the bitstream can be parsed by considering only other cases of separable transform or transform skipping, without considering the part where the non-separable transform occurs in the primary transform. Accordingly, the method of parsing transform index information for the primary transform may be dependent on whether or not the secondary transform is applied. That is, when the decoding apparatus (decoder) system first parses the transform index information for the primary transform, whether the transform index information for the secondary transform is parsed may depend on the value of the transform index information for the primary transform.

That is, as an example, from the perspective of the encoding apparatus, if the transform index information for the primary transform is related to the non-separable transform kernel, the secondary transform, which is the non-separable transform, may be restricted from being performed. Or, as an example, based on the secondary transform, which is the non-separable transform, being performed, from the perspective of the decoding apparatus, the transform index information for the primary transform may be limited to be related to the separable transform kernel.

As another example, restrictions on the use of the secondary transform, such as the above-described example, may be applied depending on the size of the block. For example, for blocks smaller than 16×16, restrictions on the use of secondary transform are not applied, and both the non-separable primary transform and the non-separable secondary transform can be applied. Or, as another example, whether to apply the non-separable primary transform and the non-separable secondary transform to an arbitrary block may be predefined in the encoding apparatus (encoder)

and/or decoding apparatus (decoder) system. As another example, whether to apply the non-separable primary transform and the non-separable secondary transform may be determined depending on the intra prediction mode direction of the corresponding transform block in addition to the size and shape of the block.

That is, as an example, based on the width and height of the current block exceeding a predetermined size and the secondary transform, which is the non-separable transform, being performed, the transform index information for the primary transform may be limited to be related to the separable transform kernel.

As another example, when the non-separable transform is applied to the primary transform, whether to apply the non-separable primary transform and the non-separable secondary transform may be determined through the distribution of values of already decoded neighboring pixels used for intra prediction. For example, if the variance of neighboring pixel values is small, the non-separable primary transform may not be applied. When the distribution of neighboring pixel values is very constant, applying the non-separable transform has a low probability of making a more accurate prediction than applying the separable transform, so separable signaling for the non-separable primary transform may not be performed. In other words, more efficient compression performance can be obtained by reducing the signaling overhead of information additionally required for the non-separable primary transform.

In this way, by efficiently applying the primary transform and the secondary transform as in the above embodiment, computational complexity can be reduced, power consumption can be reduced, and latency required for processing additional transform coefficients can be minimized.

According to one embodiment, when the primary transform includes both the separable transform and the non-separable transform, whether the non-separable primary transform is applied in the system and the kernel transmission method may be as follows.

For example, since the non-separable primary transform, unlike the non-separable secondary transform, requires the statistical characteristics of the residual signal to be predicted, obtaining a generalized kernel for the non-separable primary transform through a predefined finite kernel may be inefficient to reflect the diversity of each content. On the other hand, since the non-separable secondary transform predicts the statistical characteristics of the primary transform coefficients, it can be designed relatively simply.

Accordingly, for example, a kernel suitable for given content can be derived and used in the decoding apparatus (decoder). Or, for example, the method can be used to derive the corresponding kernel from the encoding apparatus (encoder) and transmit it to the decoding apparatus (decoder). For example, the size of the block to which the non-separable primary transform is applied, the non-separable transform set related to the intra prediction mode of the current block, the number of kernels per set, and coefficient values for each kernel may be transmitted.

As another example, since the non-separable primary transform, unlike the non-separable secondary transform, requires the statistical characteristics of the residual signal to be predicted, the number of kernels that must be predefined may be very large. In this case, many bits may be consumed in signaling the transform index information of the kernels for the non-separable primary transform, which may result in a decrease in compression performance.

Accordingly, for example, predefined kernels for the non-separable primary transform may be classified into multiple lists (categories), and category information about whether kernels included in a specific list are applied to the non-separable primary transform may be signaled at the higher level or lower level. That is, for example, the category information may indicate whether a kernel applied to the non-separable primary transform among kernels included in the category is included. Additionally, for example, the higher level may include sequence parameter set (SPS), picture parameter set (PPS), video parameter set (VPS), picture header (PH), slice header (SH), etc., and the lower level may include CTU. (coding tree unit), CU (coding unit), TU (transform unit), etc.

For example, if there are 64 kernels for a given intra prediction mode, 8 kernels may be included in each of 8 categories. At this time, for example, the category information may be transmitted at the higher level (ex: SPS, PPS, VPS, PH, or SH), and transform index information for kernels existing in the category may be transmitted at the lower level (CTU, CU, or TU). Alternatively, for example, the category information may be transmitted in units of one or more CTUs, and the transform index information for kernels within the category may be transmitted at the lower block level (one or more CUs or TUs).

Alternatively, for example, rather than a method of transmitting the category information from the encoding apparatus to the decoding apparatus, a method of deriving it from each apparatus may be applied. For example, the category information can be derived by analyzing coding information or statistical characteristics of an area (e.g. tile, slice, CTU, CU) to which the category information is applied. As a more specific example, the size, shape, prediction mode (e.g. intra prediction mode), or transform information (e.g. separable transform or non-separable transform, DCT-2/DCT-7/DCT8/DCT-5/DST-4/DST-1, identity transform (IDT), etc.) of the neighboring block of the currently coding CTU or CU. Alternatively, it can be determined which category it belongs to (the category information can be derived) depending on the variance value or range for neighboring pixels of the currently coding CTU or CU. In this regard, the above-described category information may naturally be derived in the decoding apparatus.

That is, as an example, the encoded information may include the category information related to the category to which the transform kernel applied to the primary transform belongs among the plurality of categories into which the plurality of transform kernels are classified. At this time, as an example, the category information may be transmitted at a higher level, and the transform index information for the primary transform may be transmitted at the lower level, Additionally, as an example, the higher level may be one of Sequence parameter set (SPS), Picture parameter set (PPS), Video parameter set (VPS), Picture header (PH), and Slice header (SH), and the lower level may be one of Coding tree unit (CTU), Coding unit (CU), or Transform unit (TU).

In this way, as in the above-mentioned embodiment, the non-separable primary transform is applied within the system and information about the transform kernel is transmitted, the effect of reducing the number of bits and improving coding performance can be expected.

The following figures are made to explain a specific example of the present disclosure. Since the names of specific apparatus or names of specific signals/messages/fields described in the figures are provided as examples, the technical features of the present disclosure are not limited to the specific names used in the figures below.

Figure 9:
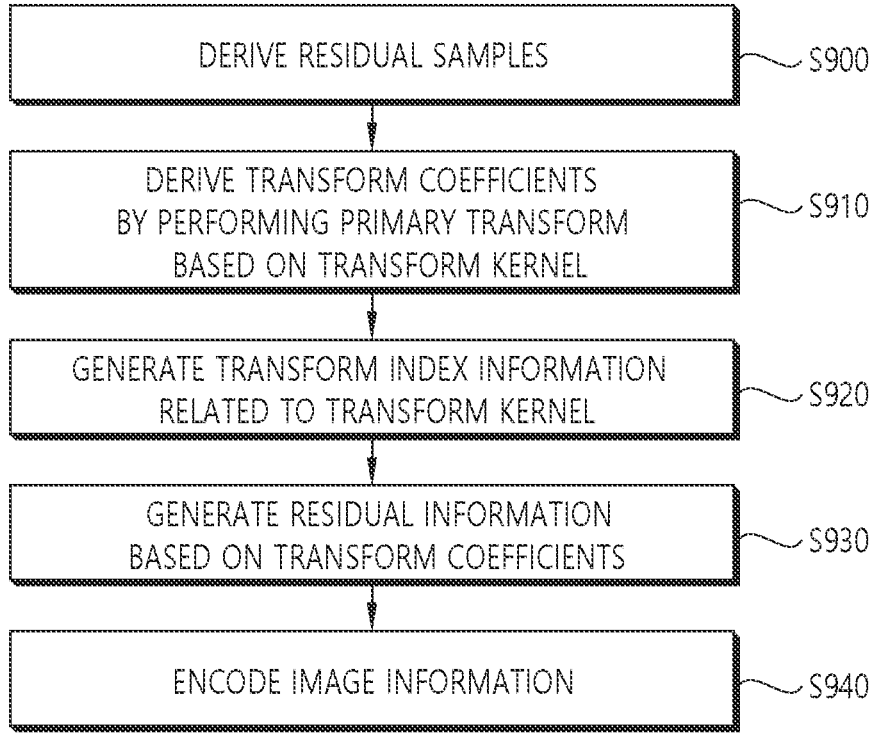
FIG. 9 and FIG. 10 schematically show an example of a video/image encoding method and related components according to the embodiment(s) of the present disclosure.
Figure 10:
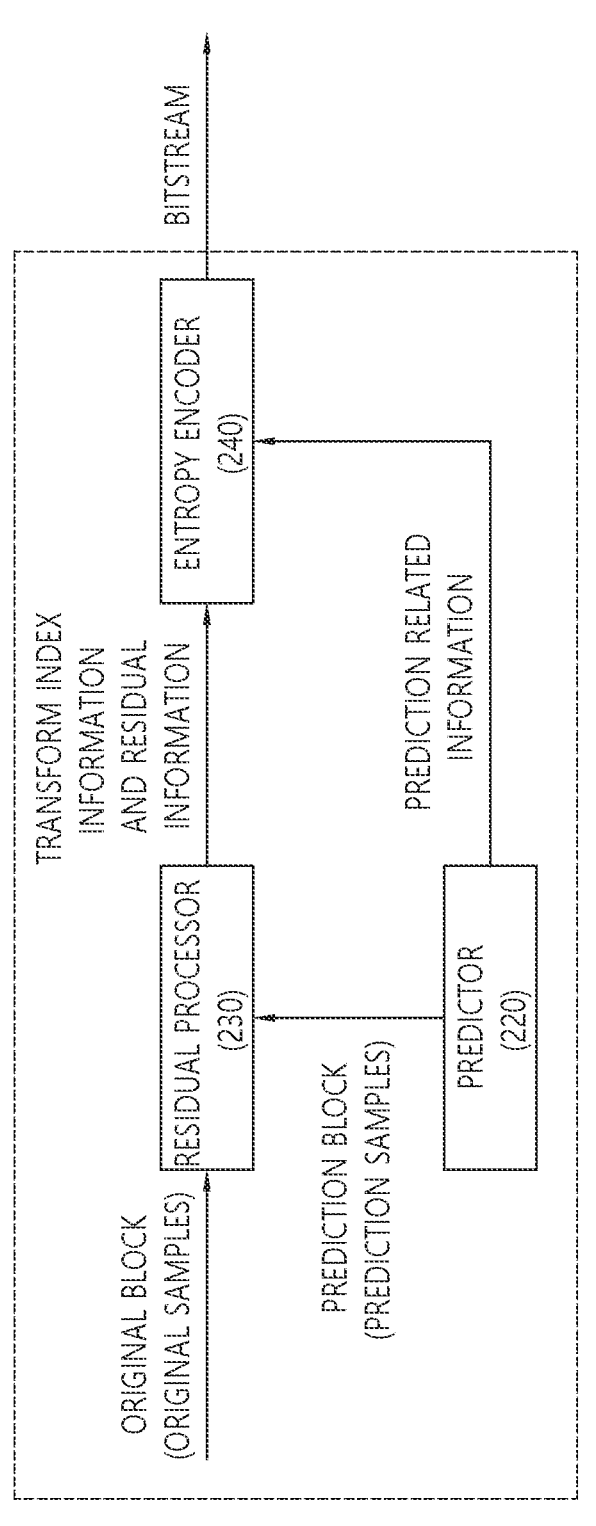

FIG. 9 and FIG. 10 schematically show an example of a video/image encoding method and related components according to the embodiment(s) of the present disclosure.

The method disclosed in FIG. 9 may be performed by the encoding apparatus disclosed in FIG. 2. Specifically, for example, S900 to S930 of FIG. 9 may be performed by the residual processor 230 of the encoding apparatus 200 of FIG. 2, and S940 of FIG. 9 may be performed by the entropy encoder 240. The method disclosed in FIG. 9 may include the embodiments described above in the present disclosure.

Referring to FIG. 9, the encoding apparatus 200 derives residual samples for a current block (S900). For example, the encoding apparatus 200 may derive prediction samples for the current block and derive residual samples for the current block based on the derived prediction samples.

The encoding apparatus 200 derives transform coefficients by performing primary transform based on a transform kernel (S910). For example, the encoding apparatus 200 may derive transform coefficients for the current block by performing primary transform on the residual samples based on the transform kernel. For example, the transform kernel may be a transform kernel applied to the primary transform among a plurality of transform kernels, and may be referred to as a transform matrix. Additionally, for example, the transform kernel may be selected based on an intra prediction mode among the plurality of transform kernels. Additionally, the transform kernel may be either a non-separable transform kernel or a separable transform kernel.

The encoding apparatus 200 generates transform index information related to the transform kernel (S920). For example, the encoding apparatus 200 may generate transform index information related to the transform kernel among the plurality of transform kernels.

The encoding apparatus 200 generates residual information based on the transform coefficients (S930). That is, for example, the encoding apparatus 200 may generate residual information based on the transform coefficients for the current block derived by performing the primary transform.

In addition, for example, S930 may include deriving modified transform coefficients for the current block by performing the secondary transform, which is the non-separable transform, on the transform coefficients, and generating residual information based on the modified transform coefficients. That is, the encoding apparatus 200 may derive modified transform coefficients by performing the secondary transform, which is the non-separable transform, on the transform coefficients for the current block derived by performing the primary transform, and may generate residual information based on the modified transform coefficients.

For example, based on the transform index information being related to the separable transform kernel, S930 may include deriving the modified transform coefficients for the current block by performing the secondary transform, which is the non-separable transform, on the transform coefficients, and generating residual information based on the modified transform coefficients. That is, for example, based on a case where the transform index information is related to the separable transform kernel, the encoding apparatus 200 may derive modified transform coefficients for the current block by performing the secondary transform, which is the non-separable transform, on the transform coefficients, and may generated the residual information based on the modified transform coefficients.

At this time, for example, the encoding apparatus 200 may derive the transform coefficients by applying LFNST to the transform coefficients based on the LFNST matrix. As an example, the LFNST may be the secondary transform and may include the non-separable secondary transform in which the RST is reflected. At this time, the LFNST matrix applied to the secondary transform may be a non-square matrix in which the number of rows is less than the number of columns.

Additionally, for example, the encoding apparatus 200 may derive quantized transform coefficients by performing quantization on the modified transform coefficients and may generate residual information on the quantized transform coefficients. For example, the residual information may include the above-described transform related information/syntax elements, such as information related to LFNST.

The encoding apparatus 200 encodes image information (S940). For example, the encoding apparatus 200 may encode image information including the transform index information and the residual information. Additionally, the image information may further include prediction related information related to prediction samples for the current block.

Additionally, the video/image information may include various information according to embodiments of the present disclosure. For example, the video/image information may include information for picture reconstruction. The information for picture reconstruction may include information related to prediction, information related to transform, and information related to filtering.

Encoded video/image information may be output in bitstream form. The bitstream may be transmitted to a decoding apparatus through a network or storage medium.

In relation to this, according to an embodiment proposed in the present disclosure, the plurality of transform kernels may include a separable transform kernel and a non-separable transform kernel.

According to an embodiment proposed in the present disclosure, the plurality of transform kernels may include one non-separable transform kernel and M separable transform kernels.

At this time, as an example, the value of the transform index information related to the one non-separable transform kernel may be 0, and the values of the transform index information related to the M separable transform kernels may be from 1 to M, where M may be a positive integer greater than 1.

Or, as an example, the value of the transform index information related to with the one non-separable transform kernel may be N, and the values of the transform index information related to the M separable transform kernels may be from 0 to N−1 and from N+1 to M, where M may be a positive integer greater than 1, and N may be a positive integer less than M.

According to an embodiment proposed in the present disclosure, the plurality of transform kernels may include L non-separable transform kernels and M separable transform kernels.

At this time, as an example, the values of the transform index information related to the L non-separable transform kernels may be from 0 to L−1, and the values of the transform index information related to the M separable transform kernels may be from L to L+M−1, where L and M may be a positive integer greater than 1.

According to an embodiment proposed in the present disclosure, the image information may further include a flag indicating whether the non-separable transform kernel is applied to the primary transform.

At this time, as an example, based on the plurality of transform kernels including one non-separable transform kernel and M separable transform kernels, and the value of the flag being 0, the transform index information may be related to the separable transform kernel. On the other hand, based on the plurality of transform kernels including one non-separable transform kernel and M separable transform kernels, and the value of the flag being 1, the transform index information may be related to any one of the one non-separable transform kernel or the M separable transform kernels.

Additionally, as an example, based on the plurality of transform kernels including L non-separable transform kernels and M separable transform kernels, and the value of the flag being 0, the transform index information may be related to the separable transform kernel. On the other hand, based on the plurality of transform kernels including L non-separable transform kernels and M separable transform kernels, and the value of the flag being 1, the transform index information may be related to the non-separable transform kernel.

Additionally, as an example, the flag may be context coded based on a context model. For example, the context model may be determined based on the size of the current block, the shape of the current block, the intra prediction mode applied to the current block, and information on previously coded blocks.

According to an embodiment proposed in the present disclosure, the transform index information may be binarized based on fixed length coding (FLC) or truncated binary code (TBC). At this time, for example, the transform index information may be coded based on context coding or bypass coding.

According to an embodiment proposed in the present disclosure, the transform index information may be binarized based on a truncated unary code. At this time, for example, the transform index information may be coded based on context coding or bypass coding.

According to an embodiment proposed in the present disclosure, based on the transform index information being related to the non-separable transform kernel, the secondary transform may be restricted not to be performed.

According to an embodiment proposed in the present disclosure, based on the width and height of the current block exceeding a predetermined size and the transform index information being related to the non-separable transform kernel, the transform index information may be the separable transform kernel.

According to an embodiment proposed in the present disclosure, the image information may further include category information related to the category to which the transform kernel applied to the primary transform belongs among the plurality of categories into which the plurality of transform kernels are classified.

At this time, according to an embodiment proposed in the present disclosure, the category information may be transmitted at a higher level, and the transform index information may be transmitted at a lower level.

For example, the higher level may be one of Sequence parameter set (SPS), Picture parameter set (PPS), Video parameter set (VPS), Picture header (PH), or Slice header (SH). Additionally, as an example, the lower level may be one of a Coding tree unit (CTU), a Coding unit (CU), and a Transform unit (TU).

Figure 11:
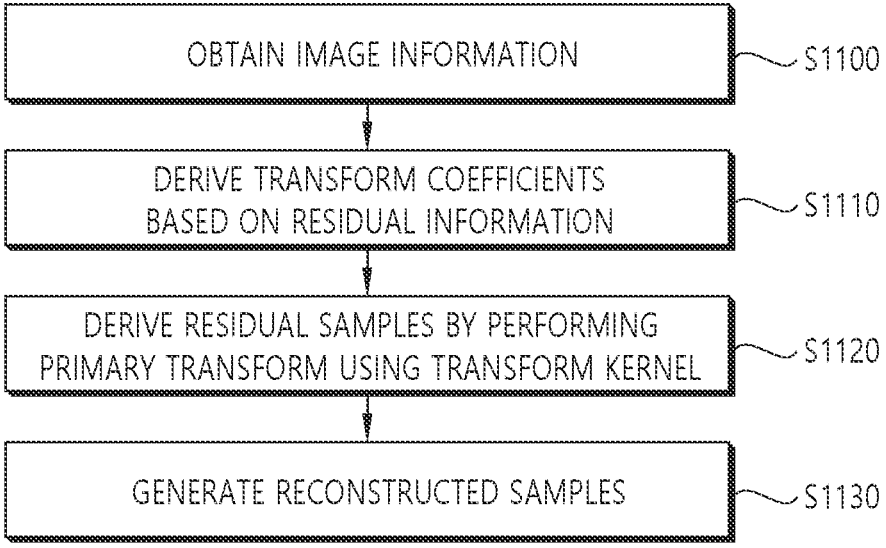
FIG. 11 and FIG. 12 schematically show an example of a video/image decoding method and related components according to an embodiment of the present disclosure.
Figure 12:
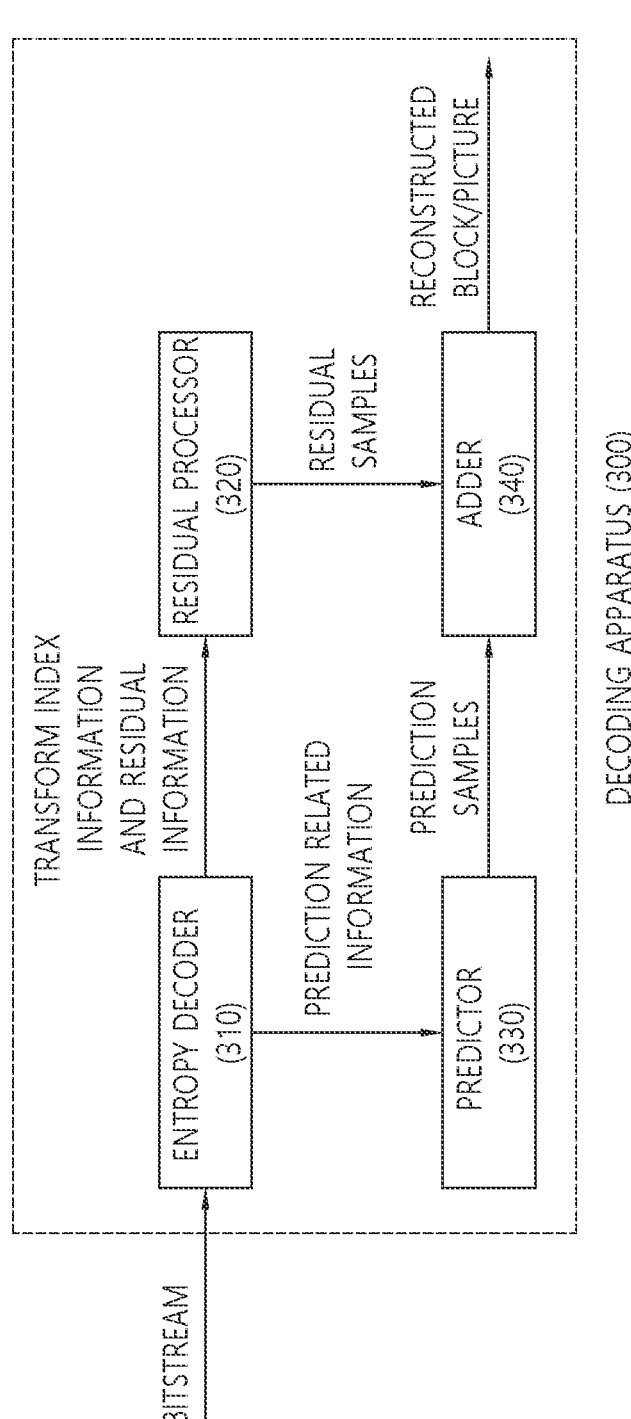

FIG. 11 and FIG. 12 schematically show an example of a video/image decoding method and related components according to an embodiment of the present disclosure.

The method disclosed in FIG. 11 can be performed by the decoding apparatus disclosed in FIG. 3. Specifically, for example S1100 in FIG. 11 may be performed by the entropy decoder 310 of the decoding apparatus 300, and S1110 and S1120 may be performed by the residual processor 320 of the decoding apparatus 300. S1130 may be performed by the adder 340. The method disclosed in FIG. 11 may include the embodiments described above in the present disclosure.

Referring to FIG. 11, the decoding apparatus 300 obtains image information through a bitstream (S1100). For example, the decoding apparatus 300 may receive/obtain video/image information through a bitstream. For example, the video/image information may include residual information and transform index information. Or, as an example, the video/image information may further include prediction related information.

Additionally, the video/image information may include various information according to embodiments of the present disclosure. For example, the video/image information may include information for picture reconstruction. The information for picture reconstruction may include information related to prediction, information related to transform, and information related to filtering.

The decoding apparatus 300 derives transform coefficients based on residual information (S1110). For example, the decoding apparatus 300 may derive transform coefficients for the current block based on the residual information. For example, the decoding apparatus 300 may derive quantized transform coefficients for the current block from the residual information. Additionally, the decoding apparatus 300 may derive transform coefficients for the current block by performing dequantization on the quantized transform coefficients. Additionally, for example, the residual information may include the above-described transform related information/syntax elements, such as information related to LFNST.

The decoding apparatus 300 derives residual samples by performing primary transform using a transform kernel (S1120). For example, the decoding apparatus 300 may derive residual samples for the current block by performing primary transform using a transform kernel related to the transform index information among a plurality of transform kernels based on the transform coefficients. For example, the transform kernel may be a transform kernel applied to the primary transform among the plurality of transform kernels, and may be referred to as a transform matrix. Additionally, for example, the transform kernel may be selected based on an intra prediction mode among the plurality of transform kernels. Additionally, the transform kernel may be either a non-separable transform kernel or a separable transform kernel. Additionally, the primary transform may be an inverse primary transform.

Also, for example, S1120 may include deriving modified transform coefficients for the current block by performing a secondary transform, which is a non-separable transform, on the transform coefficients, and deriving residual samples for the current block by performing the primary transform using a transform kernel related to the transform index information on the modified transform coefficients.

At this time, for example, the decoding apparatus 300 may derive the modified transform coefficients by applying LFNST to the transform coefficients based on the LFNST matrix. As an example, the LFNST may be a secondary (inverse) transform, and may include a non-separable secondary (inverse) transform reflecting the RST. At this time, the LFNST matrix applied to the secondary (inverse) transform may be a non-square matrix in which the number of columns is less than the number of rows.

The decoding apparatus 300 generates reconstructed samples for the current block (S1130). For example, the decoding apparatus 300 may generate reconstructed samples for the current block based on the residual samples. Additionally, the decoding apparatus 300 may generate a reconstructed picture including the reconstructed samples based on the residual samples. Additionally, the decoding apparatus 300 may generate a modified reconstructed picture by applying various filtering methods to the reconstructed picture. The modified reconstructed picture may be output and/or stored in decoded picture buffer or memory 360 as a decoded picture, and may be used as a reference picture in an inter prediction procedure when decoding a subsequent picture.

In relation to this, according to an embodiment proposed in the present disclosure, the plurality of transform kernels may include a separable transform kernel and a non-separable transform kernel.

According to an embodiment proposed in the present disclosure, the plurality of transform kernels may include one non-separable transform kernel and M separable transform kernels.

At this time, as an example, the value of the transform index information related to the one non-separable transform kernel may be 0, and the values of the transform index information related to the M separable transform kernels may be from 1 to M, where M may be a positive integer greater than 1.

Or, as an example, the value of the transform index information related to with the one non-separable transform kernel may be N, and the values of the transform index information related to the M separable transform kernels may be from 0 to N−1 and from N+1 to M, where M may be a positive integer greater than 1, and N may be a positive integer less than M.

According to an embodiment proposed in the present disclosure, the plurality of transform kernels may include L non-separable transform kernels and M separable transform kernels.

At this time, as an example, the values of the transform index information related to the L non-separable transform kernels may be from 0 to L−1, and the values of the transform index information related to the M separable transform kernels may be from L to L+M−1, where L and M may be a positive integer greater than 1.

According to an embodiment proposed in the present disclosure, the image information may further include a flag indicating whether the non-separable transform kernel is applied to the primary transform.

At this time, as an example, based on the plurality of transform kernels including one non-separable transform kernel and M separable transform kernels, and the value of the flag being 0, the transform index information may be related to the separable transform kernel. On the other hand, based on the plurality of transform kernels including one non-separable transform kernel and M separable transform kernels, and the value of the flag being 1, the transform index information may be related to any one of the one non-separable transform kernel or the M separable transform kernels.

Additionally, as an example, based on the plurality of transform kernels including L non-separable transform kernels and M separable transform kernels, and the value of the flag being 0, the transform index information may be related to the separable transform kernel. On the other hand, based on the plurality of transform kernels including L non-separable transform kernels and M separable transform kernels, and the value of the flag being 1, the transform index information may be related to the non-separable transform kernel.

Additionally, as an example, the flag may be context coded based on a context model. For example, the context model may be determined based on the size of the current block, the shape of the current block, the intra prediction mode applied to the current block, and information on previously coded blocks.

According to an embodiment proposed in the present disclosure, the transform index information may be binarized based on fixed length coding (FLC) or truncated binary code (TBC). At this time, for example, the transform index information may be coded based on context coding or bypass coding.

According to an embodiment proposed in the present disclosure, the transform index information may be binarized based on a truncated unary code. At this time, for example, the transform index information may be coded based on context coding or bypass coding.

According to an embodiment proposed in the present disclosure, based on the secondary transform being performed, the transform index information may be restricted not to be related to the non-separable transform kernel.

According to an embodiment proposed in the present disclosure, based on the width and height of the current block exceeding a predetermined size and the transform index information being related to the non-separable transform kernel, the transform index information may be the separable transform kernel.

According to an embodiment proposed in the present disclosure, the image information may further include category information related to the category to which the transform kernel applied to the primary transform belongs among the plurality of categories into which the plurality of transform kernels are classified.

At this time, according to an embodiment proposed in the present disclosure, the category information may be transmitted at a higher level, and the transform index information may be transmitted at a lower level.

For example, the higher level may be one of Sequence parameter set (SPS), Picture parameter set (PPS), Video parameter set (VPS), Picture header (PH), or Slice header (SH). Additionally, as an example, the lower level may be one of a Coding tree unit (CTU), a Coding unit (CU), and a Transform unit (TU).

In the above-described embodiment, the methods are described based on the flowchart having a series of steps or blocks, but this embodiment is not limited to the order of the above steps or blocks and some steps may occur simultaneously or in a different order from other steps as described above. Further, those skilled in the art will understand that the steps shown in the above flowchart are not exclusive, that further steps may be included, or that one or more steps in the flowchart may be deleted without affecting the scope of the embodiments of the present disclosure.

The method according to the embodiments of the present disclosure described above may be implemented in software. The encoding apparatus and/or decoding apparatus according to the present disclosure may be included in a device that performs image processing, for example, a TV, a computer, a smartphone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may include an application-specific integrated circuit (ASIC), other chipsets, a logic circuit and/or a data processing device. The memory may include a ROM (read-only memory), a RAM (random access memory), a flash memory, a memory card, a storage medium, and/or other storage device. That is, the embodiments described in the present disclosure may be implemented and performed on a processor, a microprocessor, a controller, or a chip. For example, the functional units shown in each drawing may be implemented and executed on a computer, a processor, a microprocessor, a controller, or a chip. In this case, information (ex. Information on instructions) for implementation or an algorithm may be stored in a digital storage medium.

In addition, the decoding apparatus and the encoding apparatus to which the embodiments of the present disclosure are applied may be applied to multimedia communication devices such as a multimedia broadcasting transmitting and receiving device, a mobile communication terminal, a home cinema video device, a digital cinema video device, a surveillance camera, a video chatting device, (3D) video devices, video telephony video devices, and medical video devices, and the like, which may be included in, for example, a storage medium, a camcorder, a video on demand (VOD) service provision device, an OTT video (Over the top video), an Internet streamlining service providing device, a 3D video device, a virtual reality (VR) device, an augmented reality (AR) device, a video call device, a transportation means terminal (e.g., vehicle (including autonomous vehicle) terminal, airplane terminal, ship terminal, etc.) and may be used to process video signals or data signals. For example, the OTT video (over the top video) device may include a game console, a Blu-ray player, an Internet access TV, a home theater system, a smartphone, a tablet PC, a digital video recorder (DVR).

Further, the processing method to which the embodiments of the present disclosure are applied may be produced in the form of a computer-executed program, and may be stored in a computer-readable recording medium. The multimedia data having the data structure according to the embodiment(s) of the present disclosure may also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-ROM, magnetic tape, floppy disk, and optical data storage devices. In addition, the computer-readable recording medium includes media implemented in the form of a carrier wave (for example, transmission over the Internet). In addition, the bit stream generated by the encoding method may be stored in a computer-readable recording medium or transmitted over a wired or wireless communication network.

Further, an embodiment(s) of the present disclosure may be implemented as a computer program product by program code, and the program code may be executed in a computer according to an embodiment(s) of the present disclosure. The program code may be stored on a carrier readable by a computer.

Figure 13:
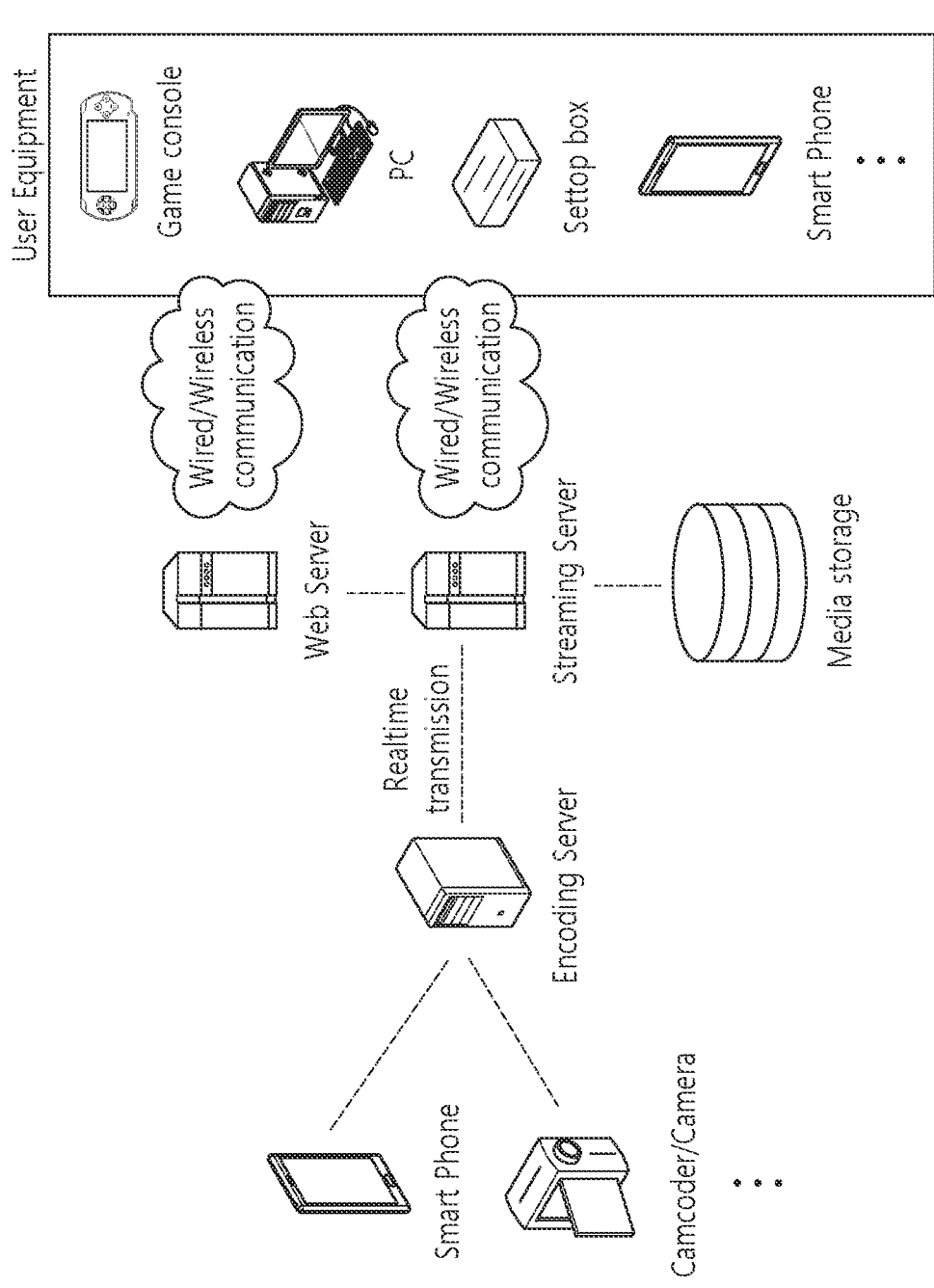
FIG. 13 illustrates an example of a content streaming system to which the embodiments disclosed in this disclosure can be applied.

FIG. 13 is a diagram illustrating a structure of a content streaming system to which the embodiments of the present disclosure are applied.

Referring to FIG. 13, the content streaming system to which the embodiments of the present disclosure are applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted.

The bitstream may be generated by the encoding method to which the embodiments of the present disclosure are applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smart watch, a smart glass, a head mounted display (HMD)), a digital TV, a desktop computer, a digital signage, or the like.

The respective servers within the content streaming system may be operated by a distribution server, and in this case, the data received by each server may be distributed and processed.

Claims described in the present specification may be combined in various methods. For example, the technical features of method claims of the present specification may be combined and implemented as a device, and the technical features of device claims of the present specification may be combined and implemented as a method. Further, the technical features of the method claims of the present specification and the technical features of the device claims thereof may be combined and implemented as a device, and the technical features of the method claims of the present specification and the technical features of the device claims thereof may be combined and implemented as a method.

What is claimed is:

1. An image decoding method performed by a decoding apparatus, the method comprising:
obtaining image information through a bitstream, wherein the image information includes residual information and transform index information;

deriving transform coefficients for a current block based on the residual information;

deriving residual samples for the current block by performing a primary transform using a transform kernel related to the transform index information among a plurality of transform kernels based on the transform coefficients; and generating reconstructed samples for the current block based on the residual samples, wherein the plurality of transform kernels include a separable transform kernel and a non-separable transform kernel, and wherein the image information further includes a flag indicating whether the non-separable transform kernel is applied to the primary transform.

2. The image decoding method of claim 1, wherein based on the plurality of transform kernels including one non-separable transform kernel and M separable transform kernels, a value of transform index information related to the one non-separable transform kernel is 0, and values of transform index information related to the M separable transform kernels are from 1 to M, and wherein M is a positive integer greater than 1.

3. The image decoding method of claim 1, wherein based on the plurality of transform kernels including one non-separable transform kernel and M separable transform kernels, a value of transform index information related to the one non-separable transform kernel is N, and values of transform index information related to the M separable transform kernels are from 0 to N−1 and from N+1 to M, and wherein M is a positive integer greater than 1, and N is a positive integer less than M.

4. The image decoding method of claim 1, wherein based on the plurality of transform kernels including L non-separable transform kernels and M separable transform kernels, values of transform index information related to the L non-separable transform kernels are from 0 to L−1, and values of transform index information related to the M separable transform kernels are from L to L+M−1, and wherein L and M are positive integers greater than 1.

5. The image decoding method of claim 1, wherein based on a value of the flag being 0, the transform index information is related to the separable transform kernel.

6. The image decoding method of claim 5, wherein based on the plurality of transform kernels including L non-separable transform kernels and M separable transform kernels and the value of the flag being 1, the transform index information is related to the non-separable transform kernel, and wherein L and M are positive integers greater than 1.

7. The image decoding method of claim 5, wherein the flag is context coded based on a context model, and wherein the context model is determined based on a size of the current block, a shape of the current block, an intra prediction mode applied to the current block, and information on previously coded blocks.

8. The image decoding method of claim 1, wherein the transform index information is binarized based on Fixed Length Coding (FLC) or Truncated Binary Code (TBC), and wherein the transform index information is coded based on context coding or bypass coding.

9. The image decoding method of claim 1, wherein the transform index information is binarized based on a truncated unary code, and wherein the transform index information is coded based on context coding or bypass coding.

10. The image decoding method of claim 1, wherein the deriving the residual samples for the current block includes:

deriving modified transform coefficients for the current block by performing a secondary transform, which is a non-separable transform, on the transform coefficients; and deriving the residual samples for the current block by performing the primary transform on the modified transform coefficients using the transform kernel related to the transform index information, and wherein based on the secondary transform being performed, the transform index information is limited to be related to the separable transform kernel.

11. The image decoding method of claim 10, wherein based on width and height of the current block exceeding a predetermined size and the secondary transform being performed, the transform index information is limited to be related to the separable transform kernel.

12. The image decoding method of claim 1, wherein the image information further includes category information related to a category to which the transform kernel applied to the primary transform belongs among a plurality of categories into which the plurality of transform kernels are classified.

13. The image decoding method of claim 12, wherein the category information is transmitted at a higher level, and the transform index information is transmitted at a lower level, and wherein the higher level is one of Sequence parameter set (SPS), Picture parameter set (PPS), Video parameter set (VPS), Picture header (PH), and Slice header (SH), and the lower level is one of Coding tree unit (CTU), Coding unit (CU) and Transform unit (TU).

14. An image encoding method performed by an encoding apparatus, the method comprising:

deriving residual samples for a current block;

deriving transform coefficients for the current block by performing a primary transform on the residual samples based on a transform kernel;

generating transform index information related to the transform kernel among a plurality of transform kernels;

generating residual information based on the transform coefficients; and encoding image information including the transform index information and the residual information, wherein the plurality of transform kernels include a separable transform kernel and a non-separable transform kernel, and wherein the image information further includes a flag indicating whether the non-separable transform kernel is applied to the primary transform.

15. The image encoding method of claim 14, wherein based on the plurality of transform kernels including one non-separable transform kernel and M separable transform kernels, a value of transform index information related to the one non-separable transform kernel is 0, and values of transform index information related to the M separable transform kernels are from 1 to M, and wherein M is a positive integer greater than 1.

16. The image encoding method of claim 14, wherein based on the plurality of transform kernels including one non-separable transform kernel and M separable transform kernels, a value of transform index information related to the one non-separable transform kernel is N, and values of transform index information related to the M separable transform kernels are from 0 to N−1 and from N+1 to M, and wherein M is a positive integer greater than 1, and N is a positive integer less than M.

17. The image encoding method of claim 14, wherein based on the plurality of transform kernels including L non-separable transform kernels and M separable transform kernels, values of transform index information related to the L non-separable transform kernels are from 0 to L−1, and values of transform index information related to the M separable transform kernels are from L to L+M−1, and wherein L and M are positive integers greater than 1.

18. The image encoding method of claim 14, wherein based on the transform index information being related to the separable transform kernel, the generating the residual information includes:

deriving modified transform coefficients for the current block by performing a secondary transform, which is a non-separable transform, on the transform coefficients; and generating the residual information based on the modified transform coefficients, and wherein based on the transform index information being related to the non-separable transform kernel, the secondary transform is limited not to be performed.

19. A non-transitory computer-readable digital storage medium storing a bitstream generated by the image encoding method of claim 14.

20. A transmission method of data for image, the method comprising:

obtaining a bitstream for the image, wherein the bitstream is generated based on deriving residual samples for a current block, deriving transform coefficients for the current block by performing a primary transform on the residual samples based on a transform kernel, generating transform index information related to the transform kernel among a plurality of transform kernels, generating residual information based on the transform coefficients, and encoding image information including the transform index information and the residual information; and transmitting the data comprising the bitstream, wherein the plurality of transform kernels include a separable transform kernel and a non-separable transform kernel, and wherein the image information further includes a flag indicating whether the non-separable transform kernel is applied to the primary transform.

* * * * *